US007627312B2

(12) United States Patent
Varadarajan et al.

(10) Patent No.: US 7,627,312 B2
(45) Date of Patent: Dec. 1, 2009

(54) SYSTEM AND METHOD FOR SELF-TESTING OF MOBILE WIRELESS DEVICES

(75) Inventors: Sridhar Varadarajan, Bangalore (IN); Sridhar Gangadharpalli, Bangalore (IN); Uday Golwelkar, Bangalore (IN); Korrapati Kalyana Rao, Bangalore (IN)

(73) Assignee: Satyam Computer Services Ltd., Bangalore (IN)

( * ) Notice: Subject to any disclaimer, the term of this patent is extended or adjusted under 35 U.S.C. 154(b) by 863 days.

(21) Appl. No.: 11/049,800

(22) Filed: Feb. 3, 2005

(65) Prior Publication Data

US 2006/0174162 A1    Aug. 3, 2006

(51) Int. Cl.
*H04W 24/00* (2006.01)
(52) U.S. Cl. .................. 455/423; 455/420; 714/38
(58) Field of Classification Search ........... 455/423, 455/420, 67.11; 714/38
See application file for complete search history.

(56) References Cited

U.S. PATENT DOCUMENTS

| | | | |
|---|---|---|---|
| 6,123,735 A * | 9/2000 | Raghavan et al. ........... 703/21 |
| 6,434,364 B1 | 8/2002 | O'Riordain | |
| 6,571,082 B1 * | 5/2003 | Rahman et al. ......... 455/67.11 |
| 6,587,671 B1 * | 7/2003 | Kanago et al. .......... 455/67.11 |
| 6,680,913 B1 | 1/2004 | Malmivirta et al. | |
| 6,714,779 B2 | 3/2004 | Hall et al. | |
| 6,766,164 B1 * | 7/2004 | Funk et al. ................ 455/423 |
| 6,816,886 B2 | 11/2004 | Elvanoglu et al. | |
| 7,075,893 B1 * | 7/2006 | Mlinarsky et al. ......... 370/241 |
| 7,206,548 B1 * | 4/2007 | Sumler et al. ........... 455/67.11 |
| 7,209,710 B2 * | 4/2007 | Burch et al. ............ 455/67.11 |
| 7,324,588 B2 * | 1/2008 | Green et al. ............... 375/224 |
| 7,475,289 B2 * | 1/2009 | Rosaria et al. .............. 714/38 |
| 7,548,911 B2 * | 6/2009 | Sen et al. ................... 707/4 |
| 2001/0031625 A1 * | 10/2001 | Lynn ...................... 455/67.1 |
| 2002/0147007 A1 * | 10/2002 | Hall et al. ................. 455/423 |
| 2002/0160717 A1 * | 10/2002 | Persson et al. .......... 455/67.1 |

(Continued)

OTHER PUBLICATIONS

Ichiro Satoh; "A Testing Framework For Mobile Computing Software"; IEEE Transactions Of Software Engineering, vol. 29, No. 12 (pp. 1112-1121) (Dec. 2003).

*Primary Examiner*—Charles N Appiah
*Assistant Examiner*—Kwasi Karikari
(74) *Attorney, Agent, or Firm*—The Webb Law Firm

(57) ABSTRACT

The use of mobile wireless devices is on the increase. Mobile manufactures design, develop, and release new devices to the market at regular intervals. In order to keep the market leadership, such companies need to have techniques, processes, and tools to quickly design and test their products. One of the important requirements of a communicating device is its reliability and traditionally, testing has been playing a major role in assessing and improving the reliability of the devices. However, testing in general and testing of mobile wireless devices in particular, requires complementary testing in realistic environments. A system for automating much of the testing of mobile, wireless devices in a realistic environment involves (a) identifying test cases that need to be tested in outdoor environments; (b) identifying environment conditions that should prevail during the execution of test cases; (c) planning and scheduling of test cases; (d) identifying the occurrence, in real-time, of environmental conditions; (e) automatically executing the appropriate test cases and generation of test results; and (f) group testing to efficiently test as much as possible whenever environment is test conducive.

5 Claims, 20 Drawing Sheets

System Architecture of STS System

U.S. PATENT DOCUMENTS

| | | | |
|---|---|---|---|
| 2002/0188890 A1* | 12/2002 | Shupps et al. | 714/38 |
| 2003/0070119 A1* | 4/2003 | Dallin | 714/38 |
| 2003/0156549 A1* | 8/2003 | Binder et al. | 370/252 |
| 2004/0153830 A1* | 8/2004 | Cebula et al. | 714/38 |
| 2005/0085223 A1* | 4/2005 | Liu | 455/423 |
| 2005/0102580 A1* | 5/2005 | House et al. | 714/38 |
| 2005/0166094 A1* | 7/2005 | Blackwell et al. | 714/38 |
| 2005/0204201 A1* | 9/2005 | Meenakshisundaram et al. | 714/38 |

* cited by examiner

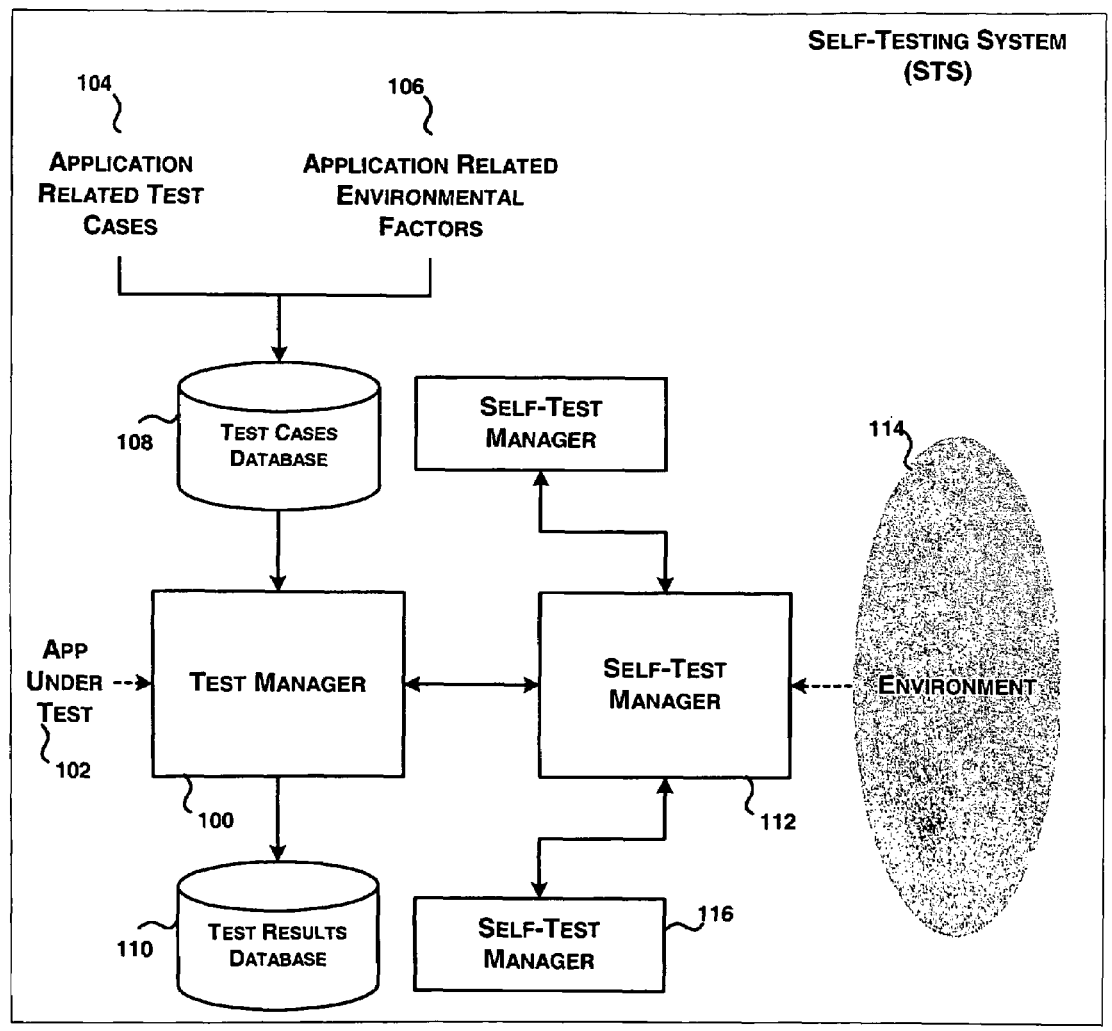
FIG. 1: SYSTEM ARCHITECTURE OF STS SYSTEM

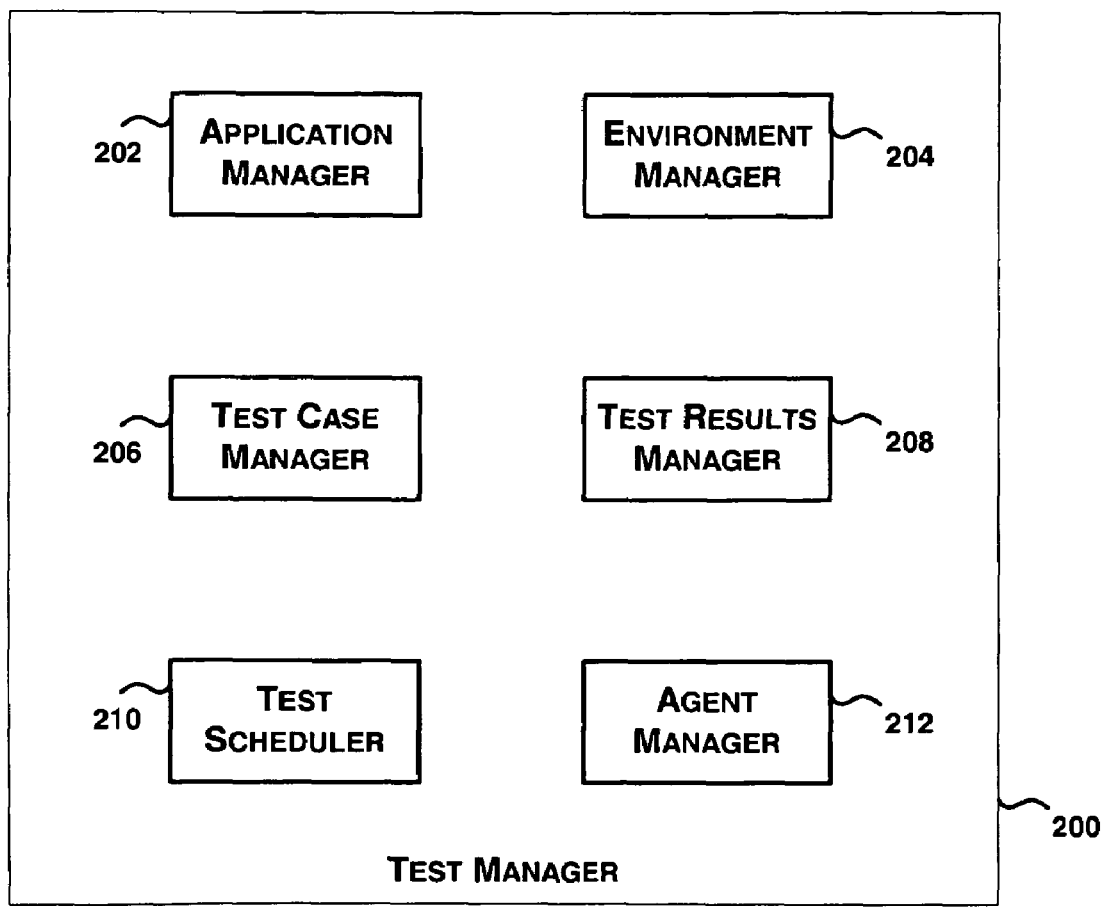
FIG. 2: FUNCTIONAL ARCHITECTURE OF TEST MANAGER

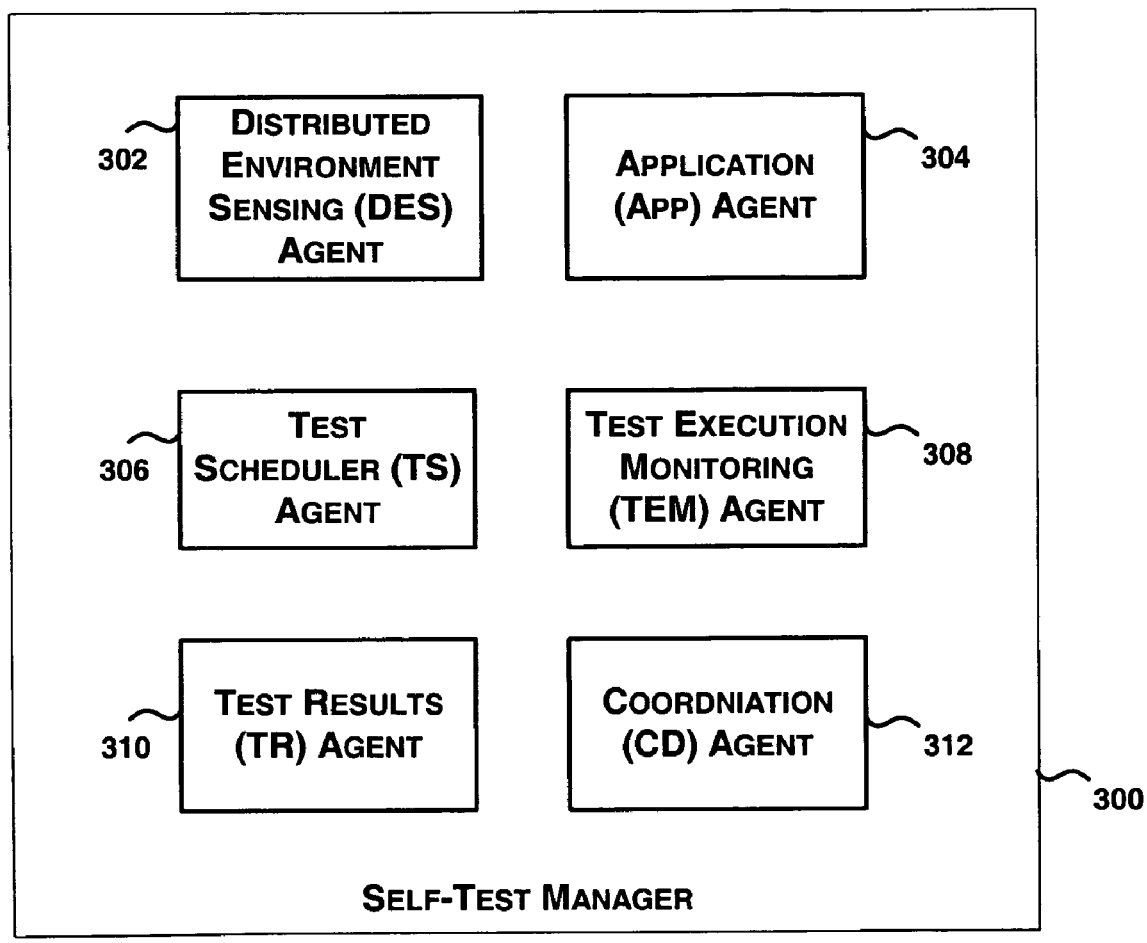
FIG. 3: FUNCTIONAL ARCHITECTURE OF SELF-TEST MANAGER

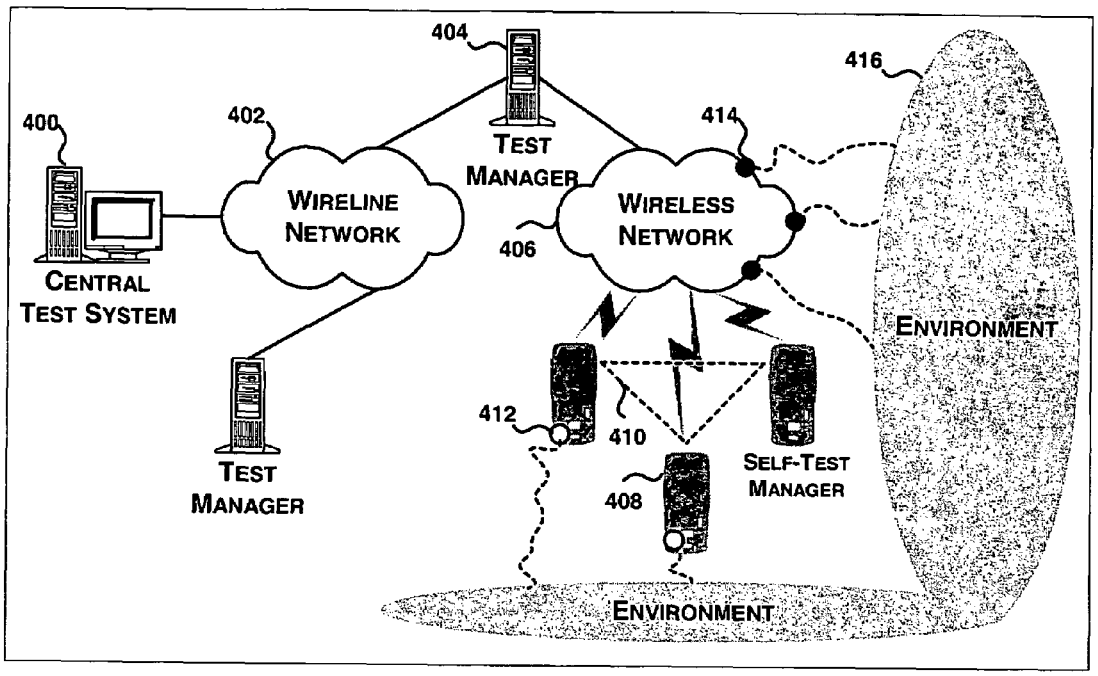
FIG. 4: NETWORK ARCHITECTURE OF STS SYSTEM
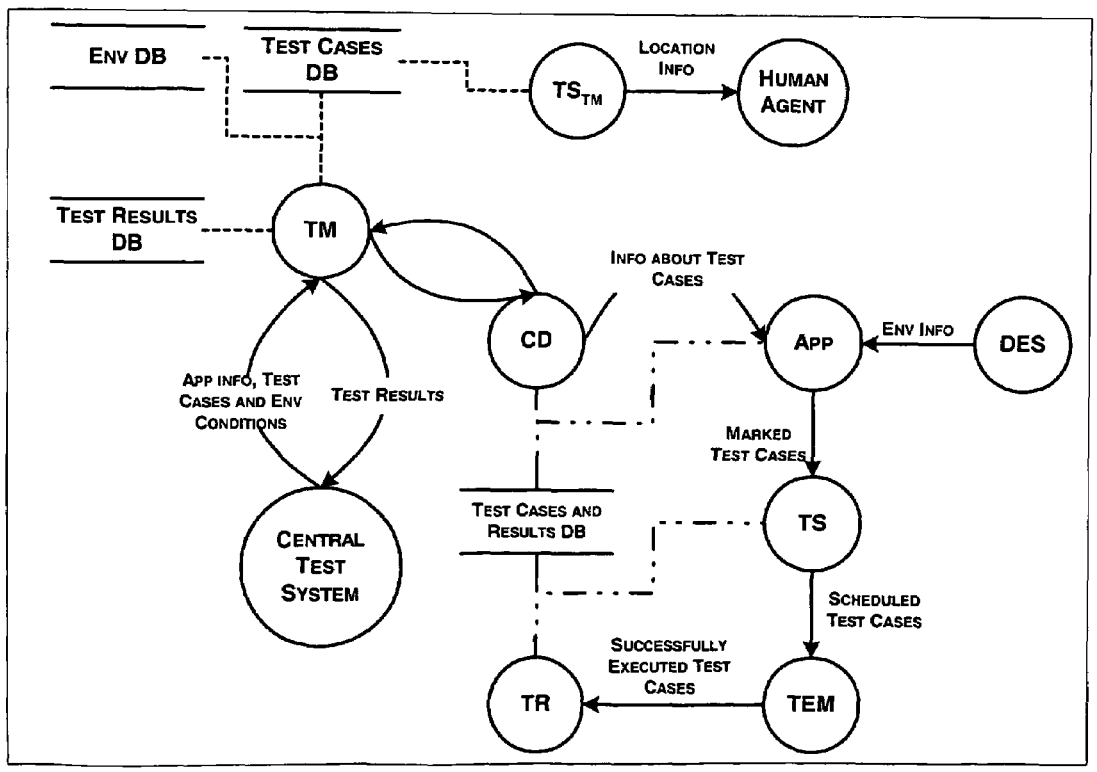
FIG. 4A: A TYPICAL WORKFLOW

FORMATS AND DATABASES

ENV EXPRESSION ~500

| EXP ID | DESCRIPTION | CNF OF EXPRESSION |
|---|---|---|

ENV DB ~502

| ENV ID | DESCRIPTION | TYPE | VALUE / RANGE / LIST OF VALUES |
|---|---|---|---|

APP DB ~504

| APP ID | DESCRIPTION | CRITICALITY | NUMBER OF TEST CASES | LIMIT DATE | APPLICATION INFORMATION |
|---|---|---|---|---|---|

TEST CASES DB ~506

| TESTCASE ID | DESCRIPTION | STUB DETAILS | EXP ID | TESTDATA IDs | EXPECTED RESULT |
|---|---|---|---|---|---|

TEST DATA DB ~508

| TESTDATA ID | DESCRIPTION | TYPICAL VALUE |
|---|---|---|

APP TEST CASES DB ~510

| APP ID | TESTCASE ID | TESTDATA ID | VALUE |
|---|---|---|---|

APP TEST RESULTS ~512

| APP ID | TESTCASE ID | TEST DATA ID | TIMESTAMP | VALUE |
|---|---|---|---|---|

SENSED ENV DB ~514

| ENV ID | LOCATION | START TIME | END TIME | VALUE |
|---|---|---|---|---|

FIG. 5: DESCRIPTION OF DATABASES

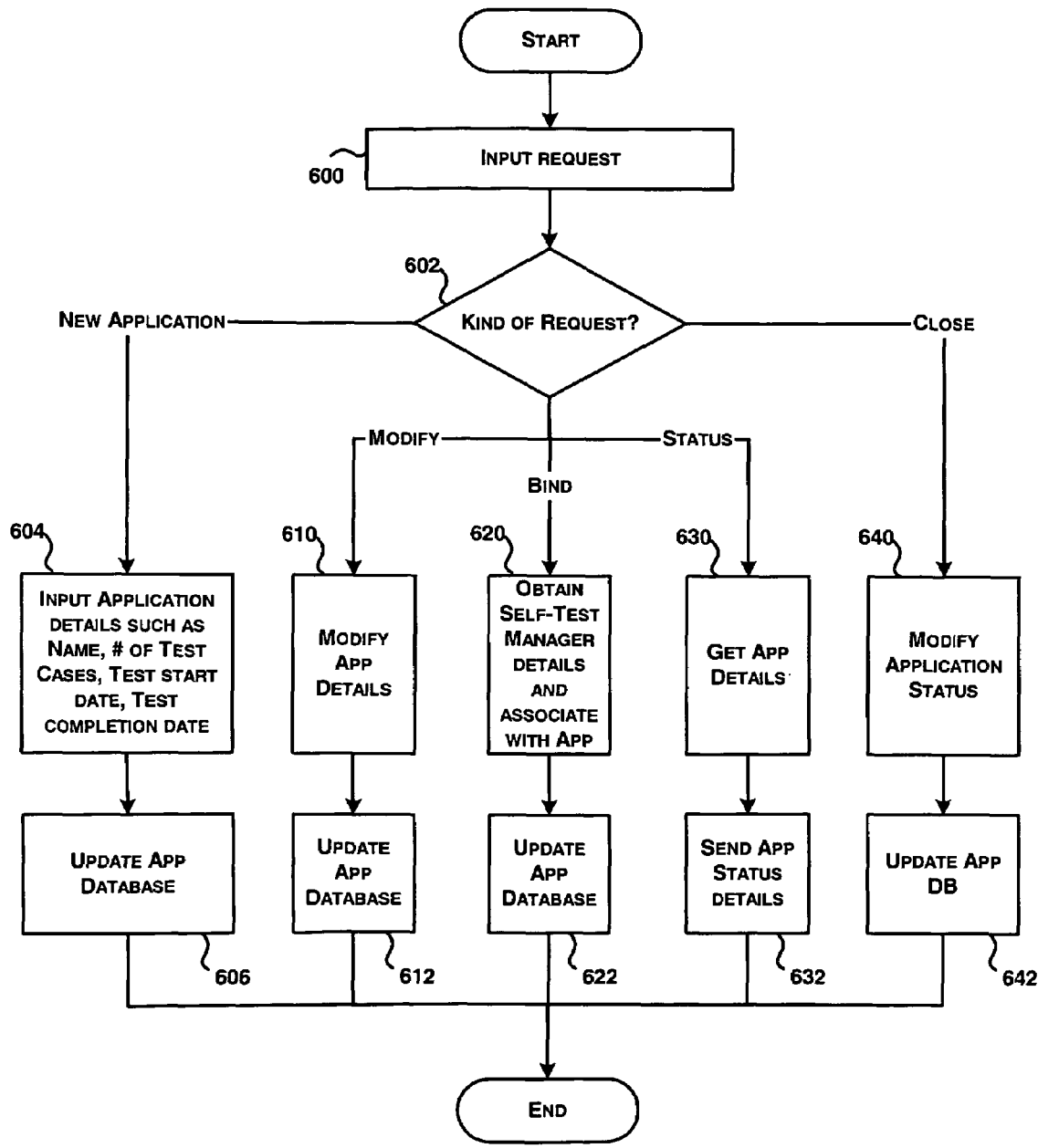
FIG. 6: APPLICATION MANAGER FUNCTIONALITY

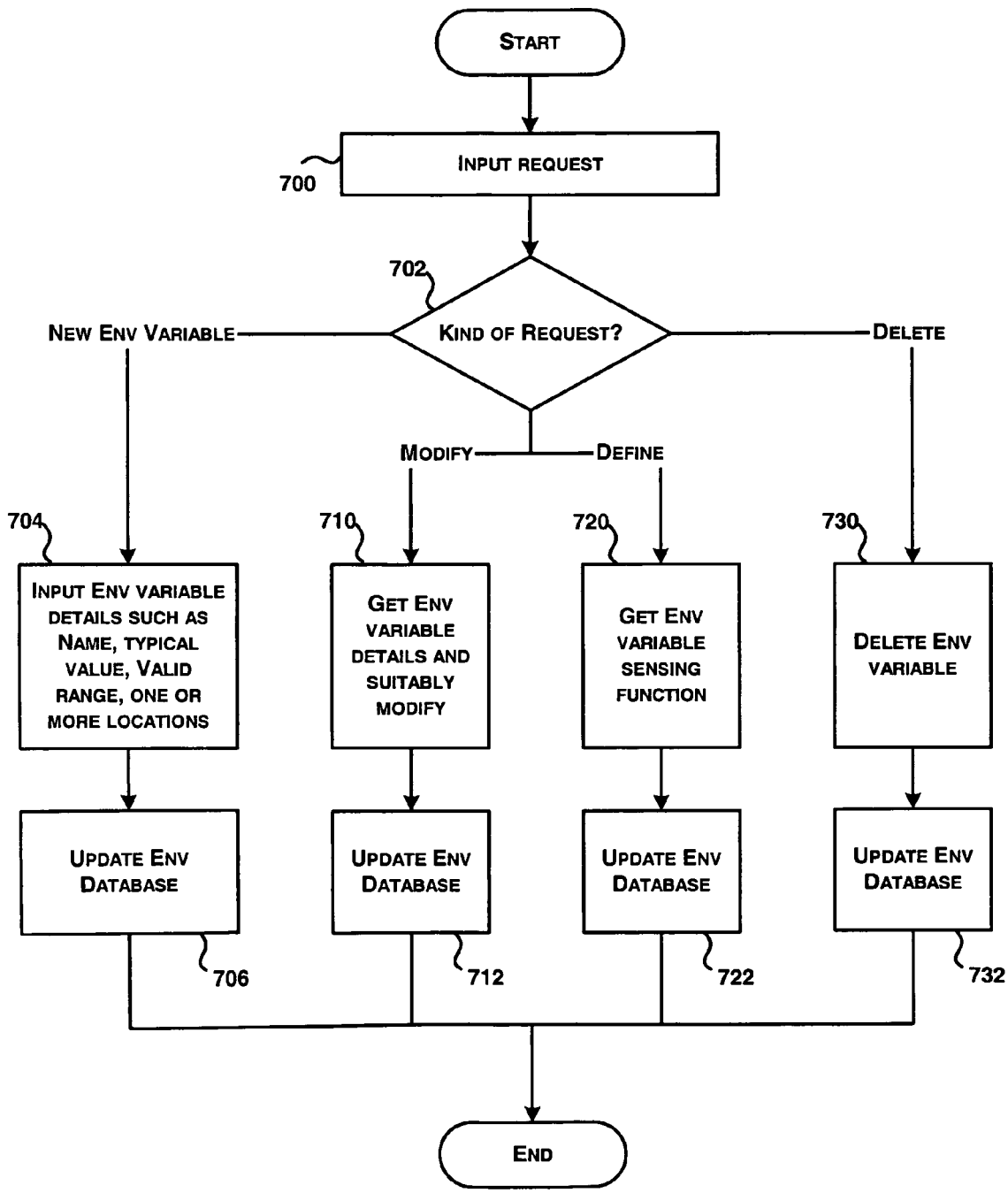
FIG. 7: ENVIRONMENT MANAGER FUNCTIONALITY

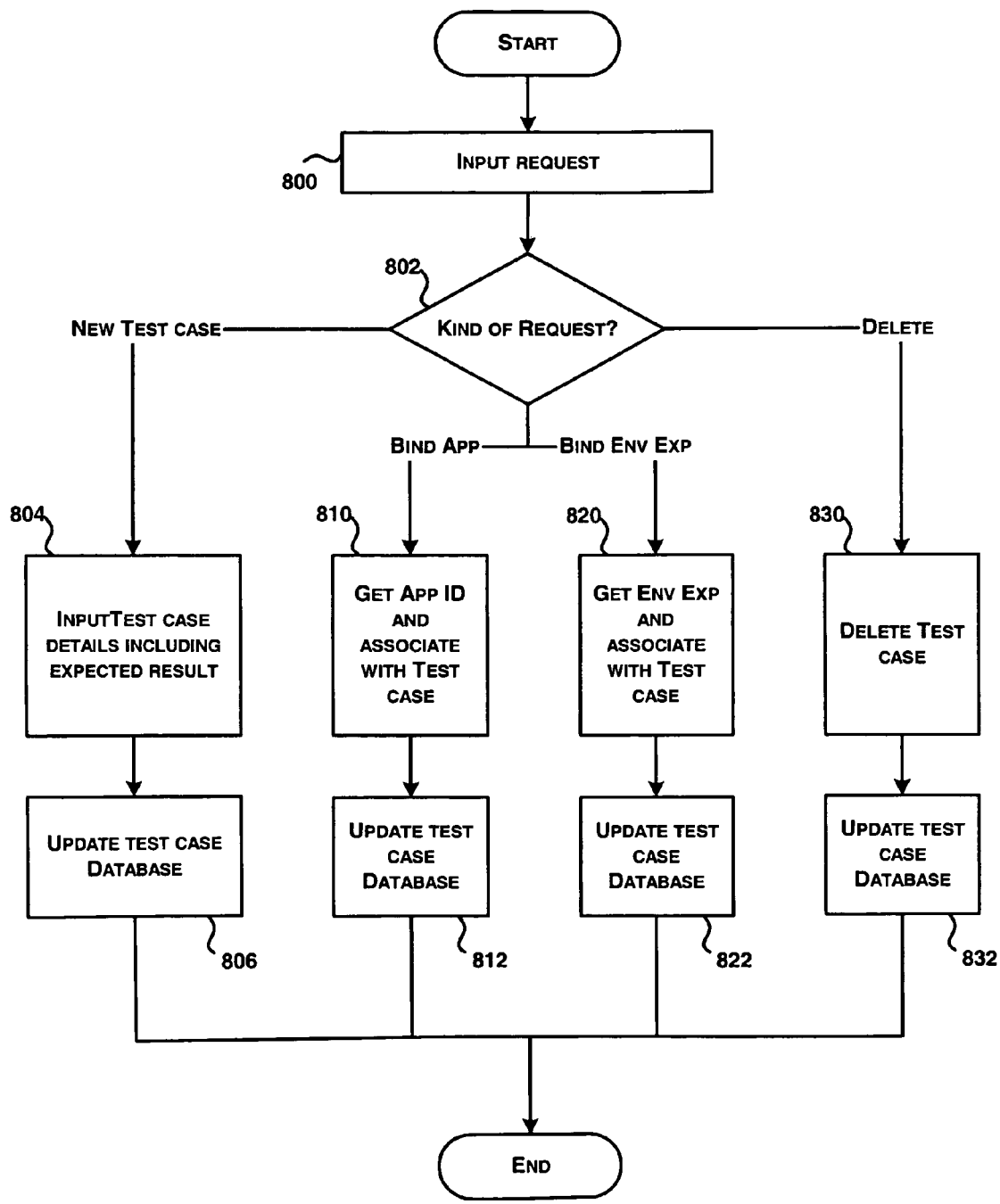
FIG. 8: TEST CASE MANAGER FUNCTIONALITY

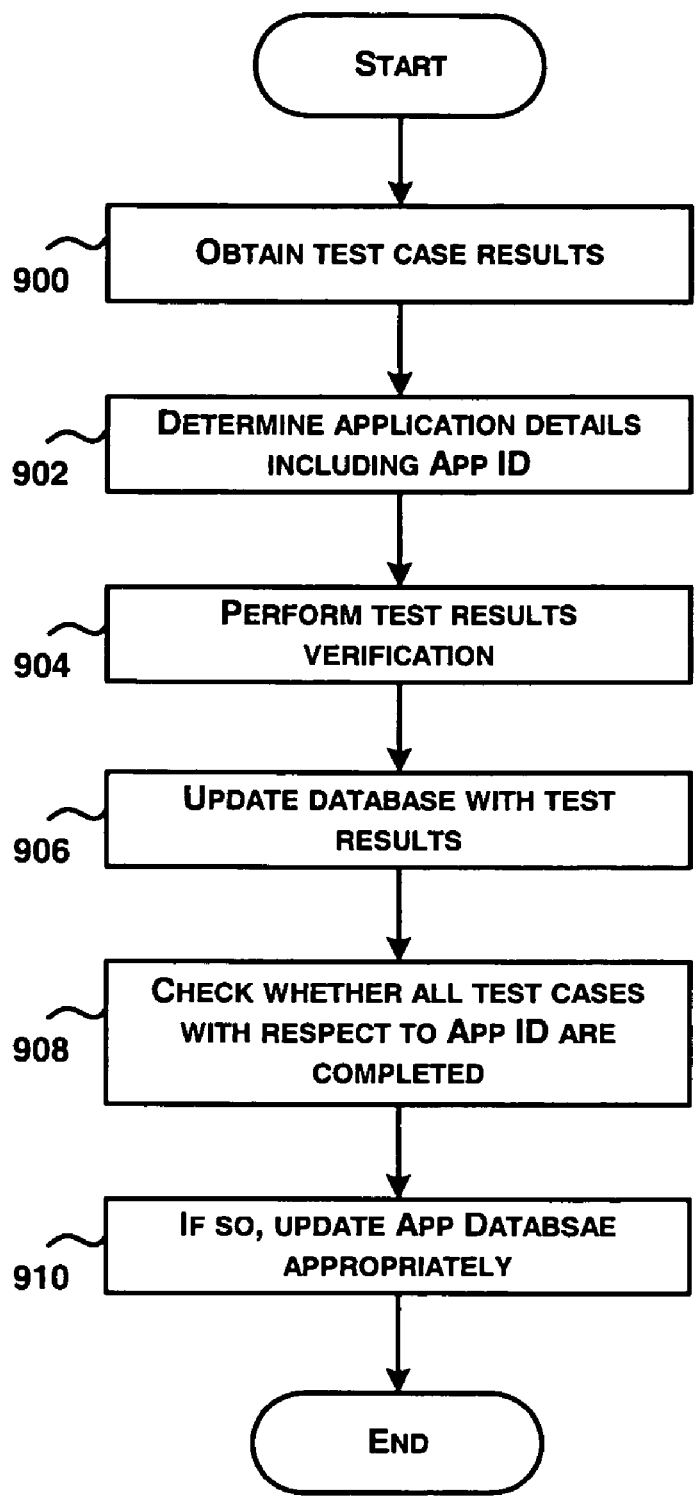
FIG. 9: TEST RESULTS MANAGER FUNCTIONALITY

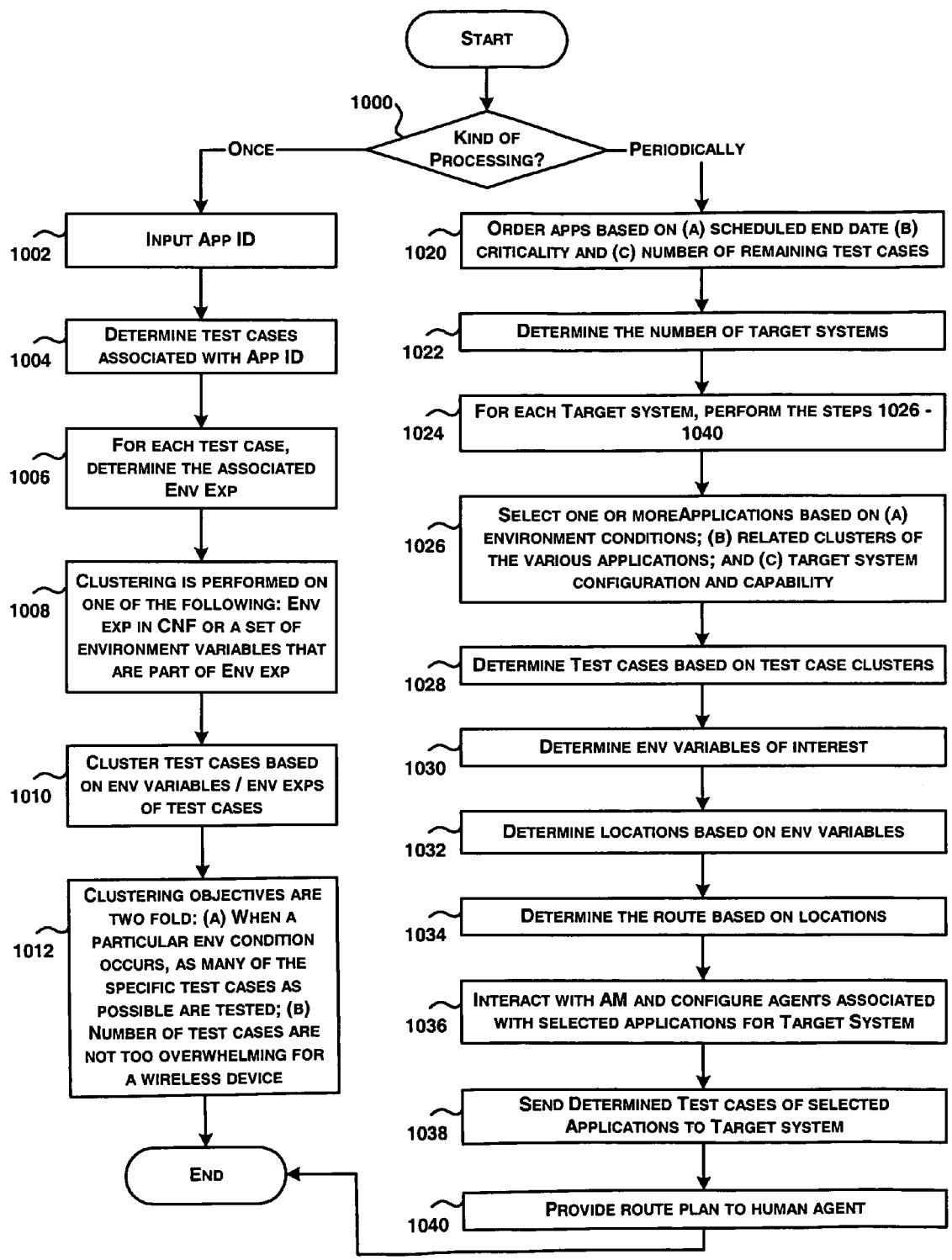
FIG.10: TEST SCHEDULER FUNCTIONALITY

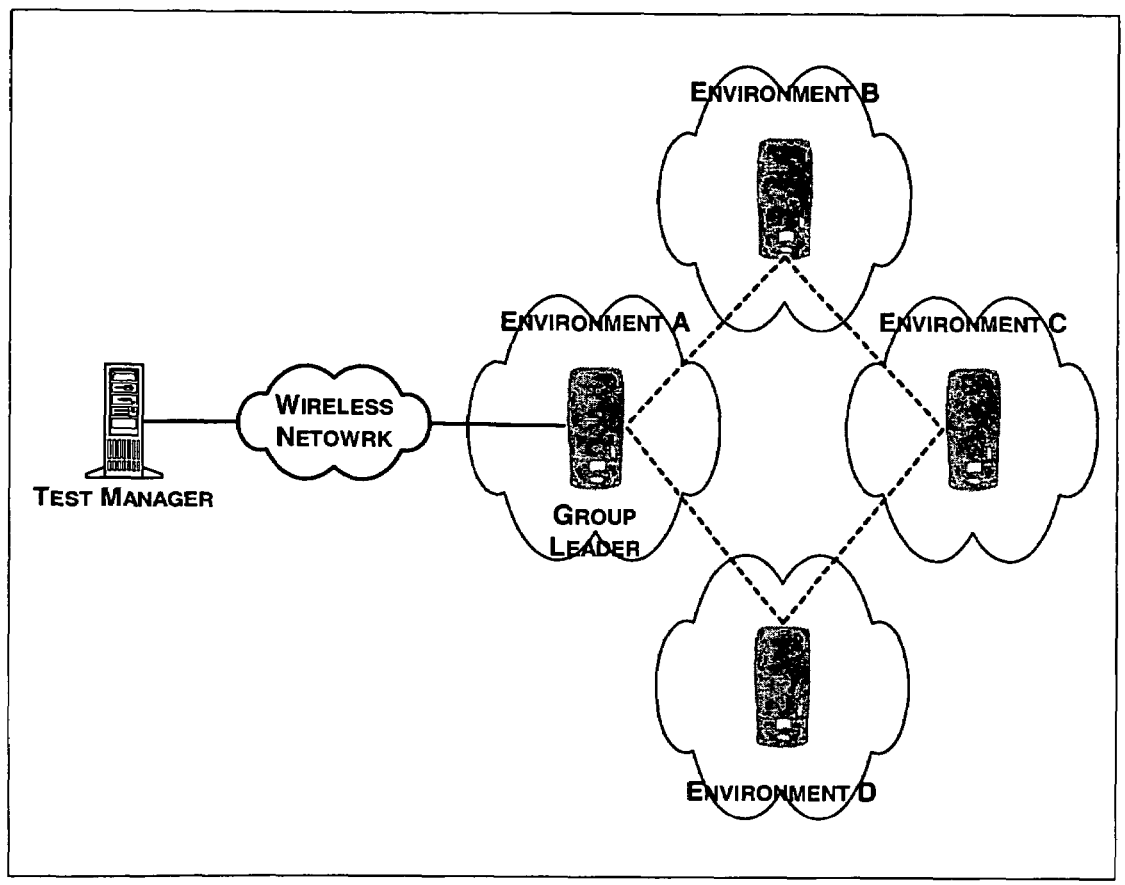
FIG. 11: NETWORK ARCHITECTURE FOR GROUP TESTING

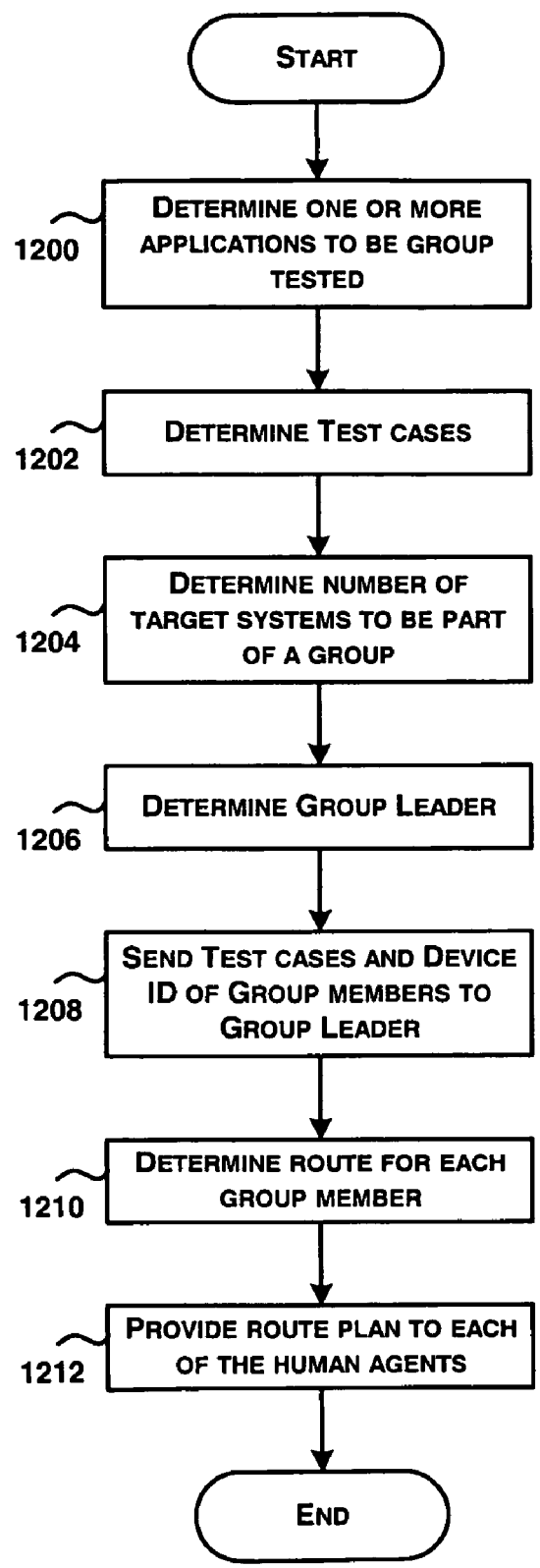
FIG. 12: GROUP TESTING SCHEDULER

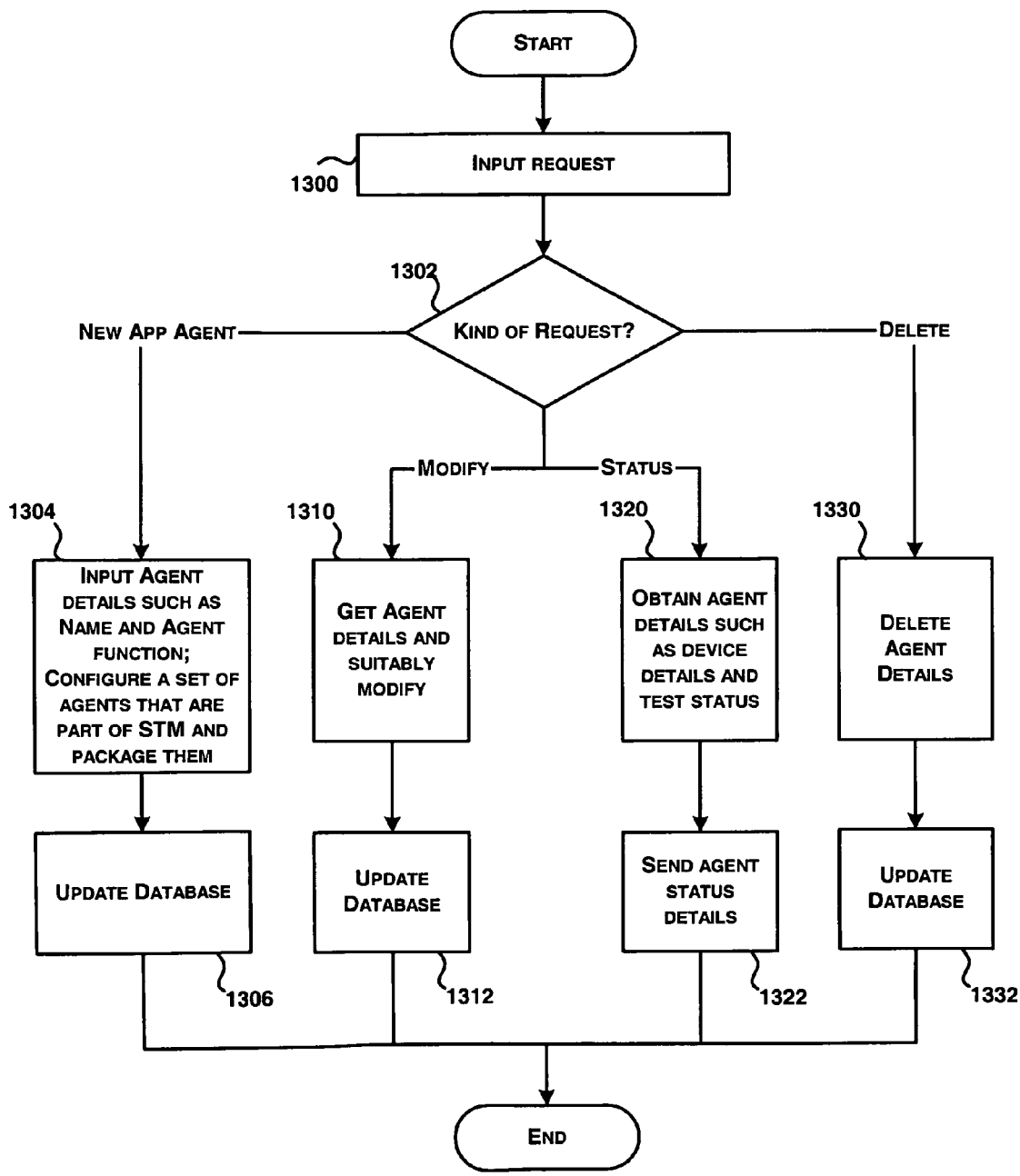
FIG. 13: AGENT MANAGER FUNCTIONALITY

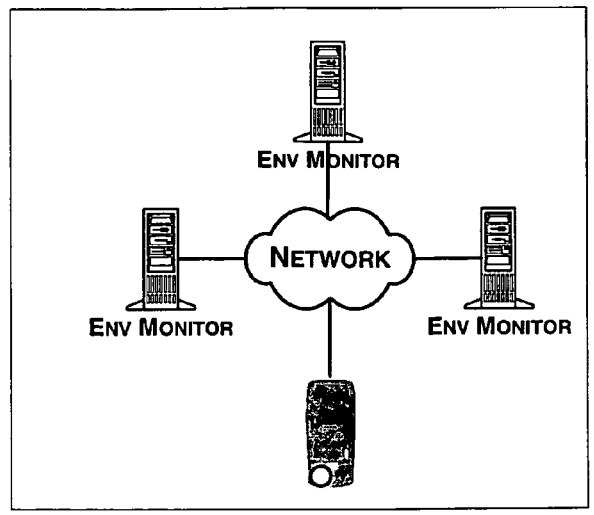
FIG. 14: NETWORK FOR DISTRIBUTED ENVIRONMENT SENSING
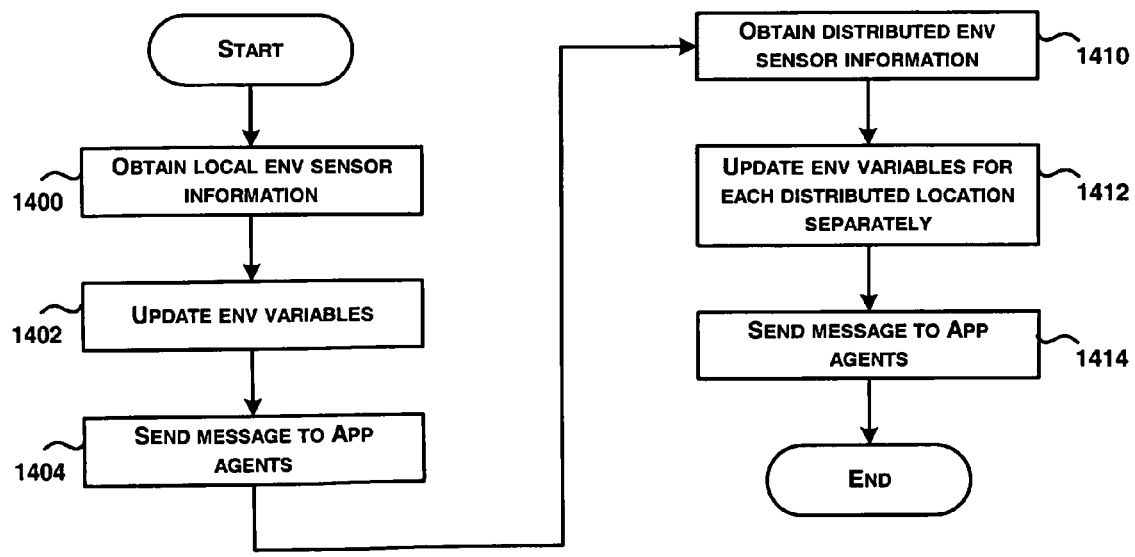
FIG. 14A: DISTRIBUTED ENVIRONMENT SENSING AGENT FUNCTIONALITY

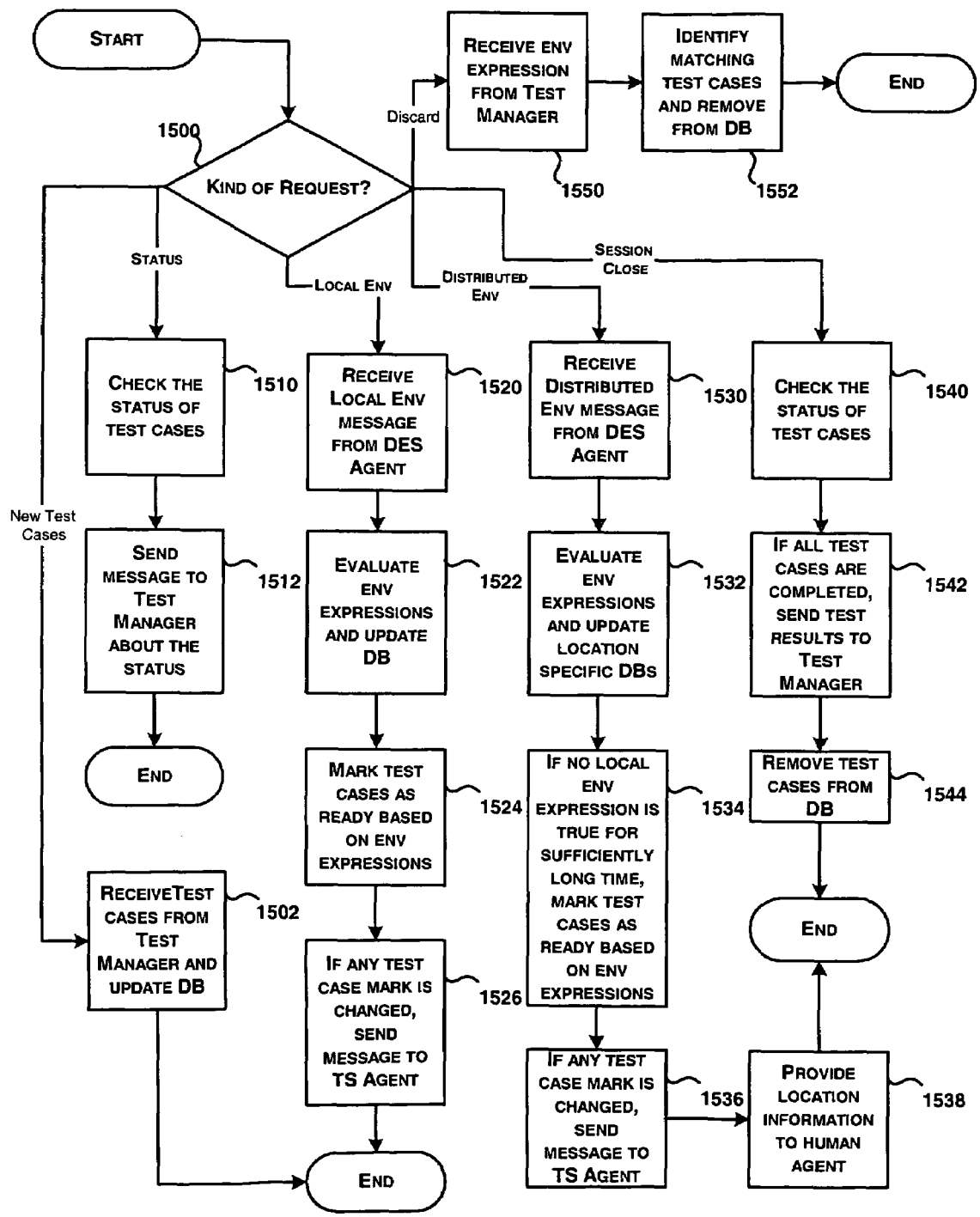
FIG.15: APPLICATION AGENT FUNCTIONALITY

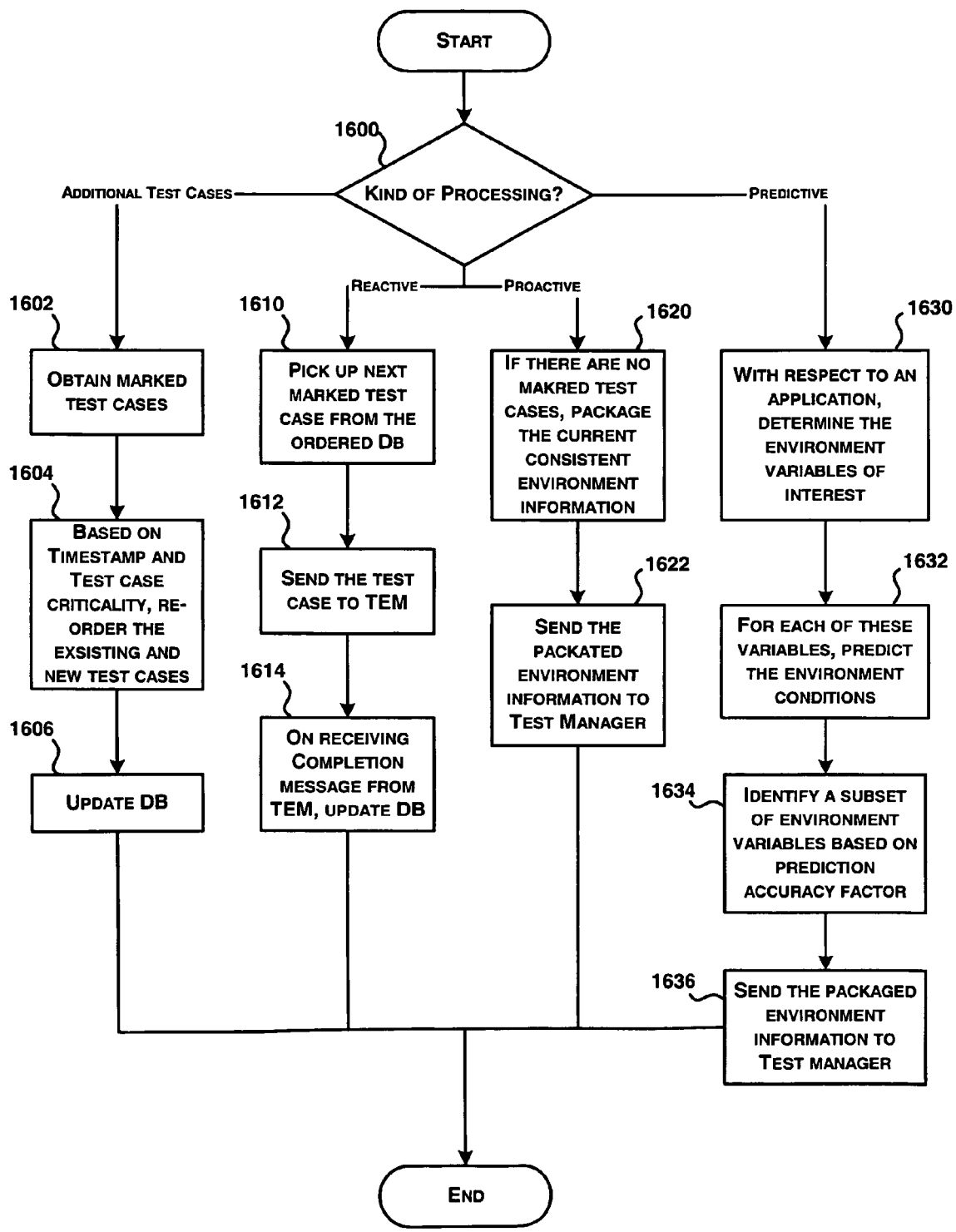
FIG.16: TEST SCHEDULER AGENT FUNCTIONALITY

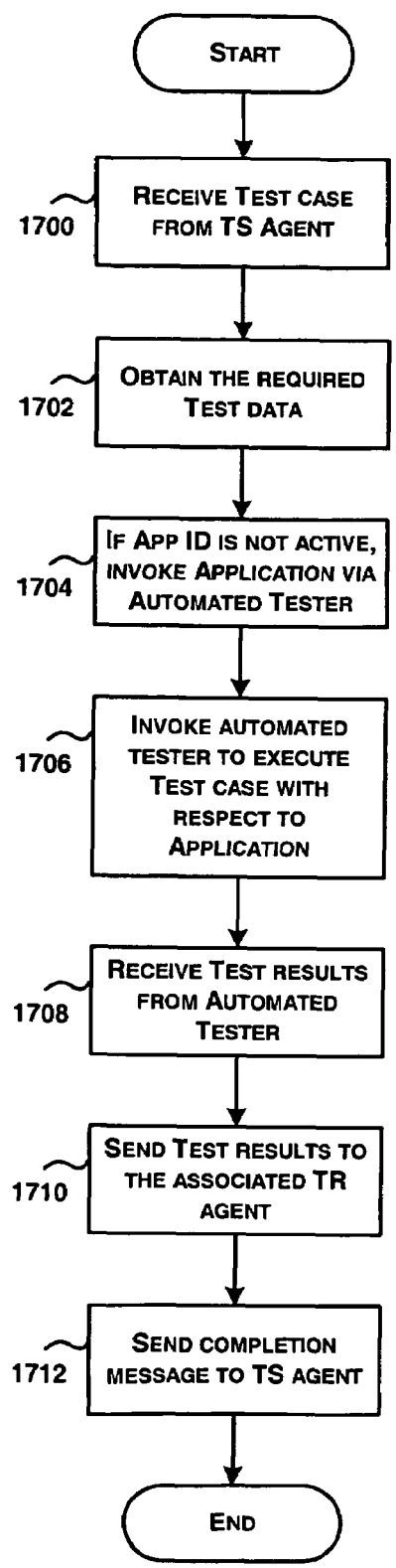
FIG. 17: TEST EXECUTION MONITORING AGENT FUNCTIONALITY

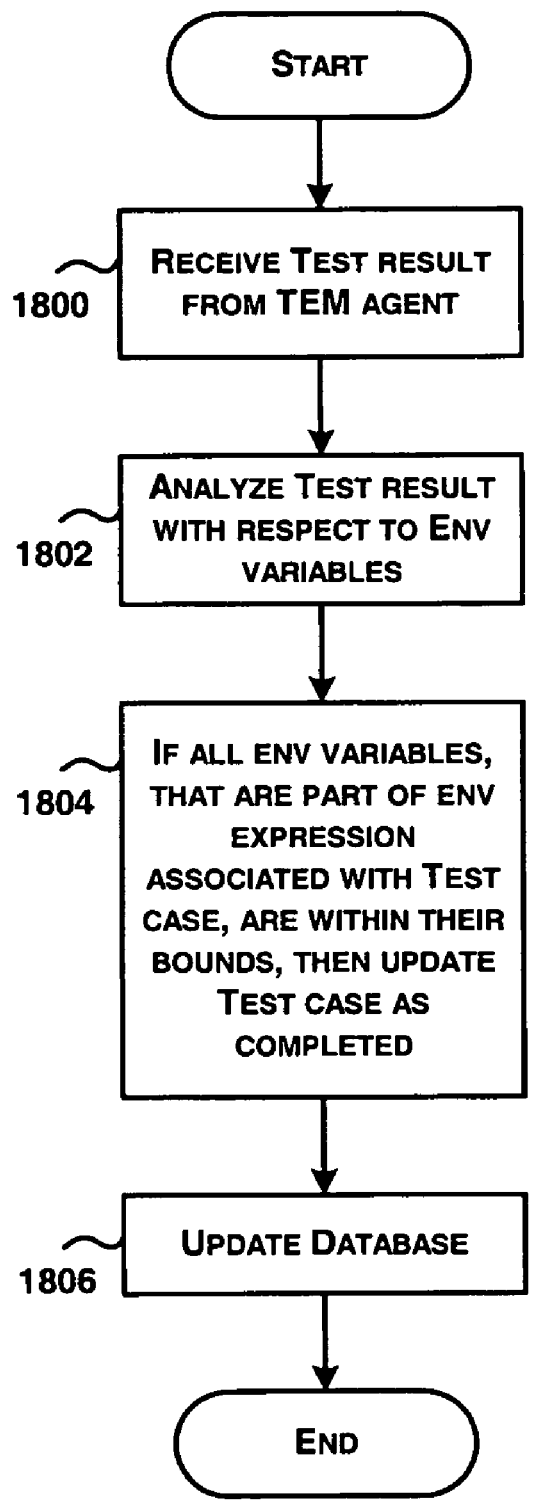
FIG. 18: TEST RESULTS AGENT FUNCTIONALITY

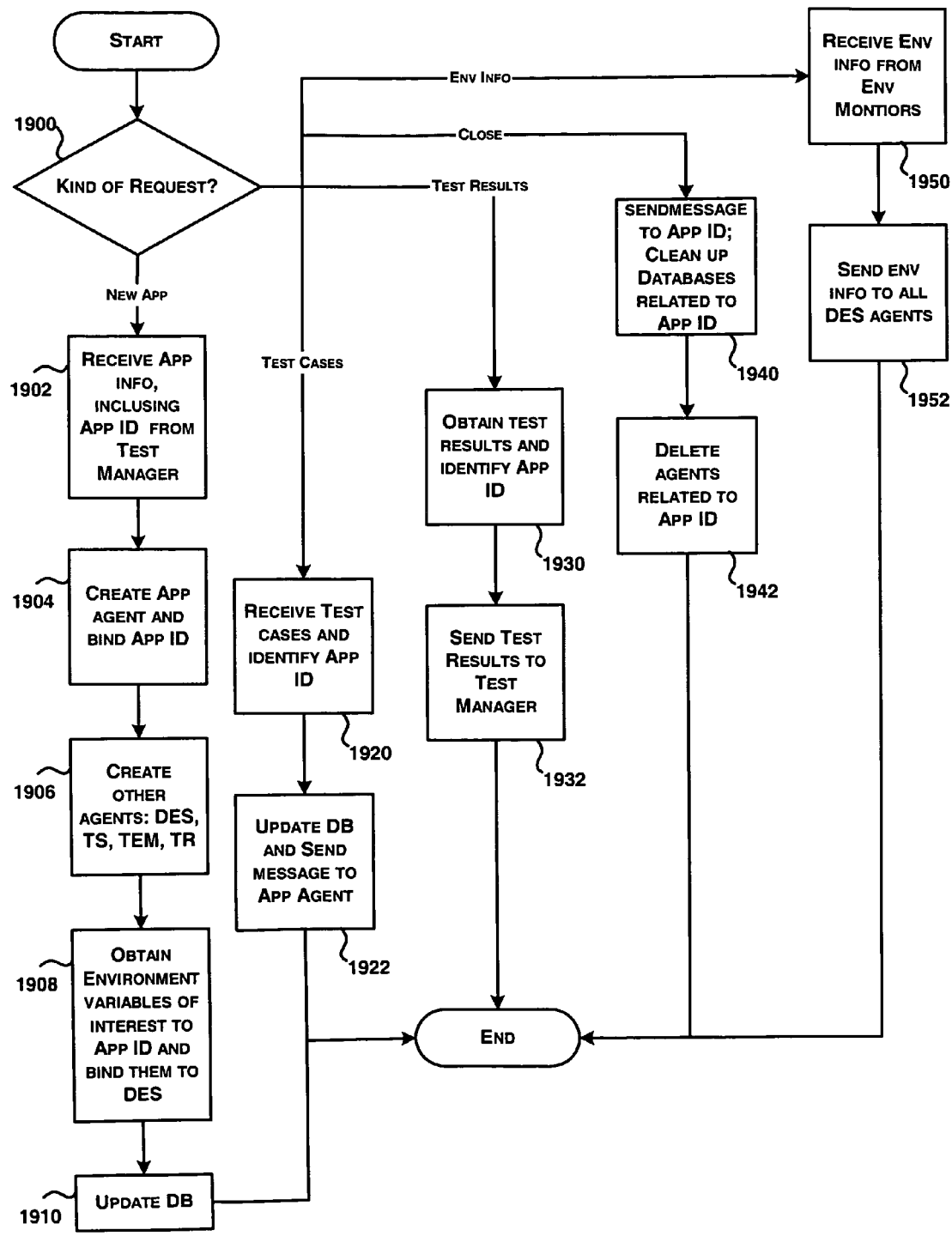
FIG. 19: COORDINATION AGENT FUNCTIONALITY

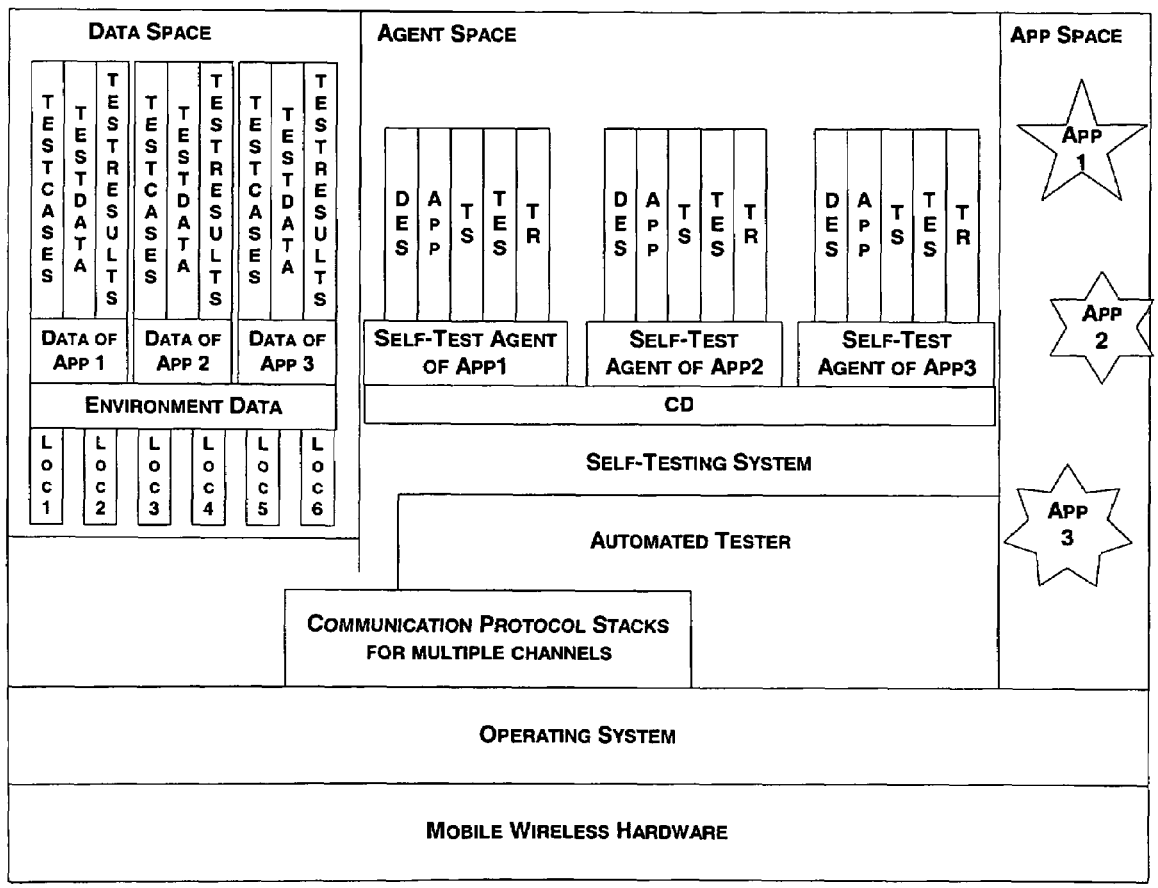
FIG. 20: STS RUN-TIME ENVIRONMENT

SYSTEM AND METHOD FOR SELF-TESTING OF MOBILE WIRELESS DEVICES

FIELD OF THE INVENTION

The present invention relates to the automatic testing of systems in general, and more particularly, automatic testing of mobile wireless devices. Still more particularly, the present invention relates to a system and method for automatic testing of mobile wireless device applications in realistic external environments based on a set of software agents and a human agent, and by determining external environment conditions and executing the most appropriate test cases based on such conditions.

BACKGROUND OF THE INVENTION

Testing of systems and applications is an important step in the design and development life cycle. One of the important objectives of testing is to discover the hidden flaws and bugs, and assess the overall reliability. Typically, testing can be undertaken in a simulated, lab environment to reduce the overall testing cost and cycle time. However, simulated, lab testing accounts for anywhere from 50% up to about 75% of the testing requirements. The remaining testing needs to be undertaken in a realistic environment leading to extended testing cycle time. Further, if manual testing procedures are used, the total testing cost also goes up proportionately.

Test automation tools focus on providing a test environment to automatically test as much of the test cases as possible. Such tools help in defining and managing test cases, managing of test data, automatically executing system or application under test with test data, and finally in recording of test results for later verification. In the cases when devices need to be tested in the field, it is useful to upload the required test cases, initiate the testing, and download test results to a lab system. The test automation tools are enhanced to address the remote testing requirements. The uploading and downloading of data to and from a device requires a communication channel between the device and the lab, and this can be achieved either by setting up a primitive communication infrastructure, or enhancing the device temporarily with the required communication channels or exploiting the communication channels available on the device. Remote testing is automated to an extent once the availability of communication channel is ensured.

Considering the case of mobile wireless device testing, the above general framework is applicable to a great extent. However, the mobile wireless devices pose unique challenges due to its dependence on external environment. For example, an application on a mobile wireless device might work satisfactorily in a lab environment and might produce surprising results while tested in a crowded environment with a lot of high-rise buildings. As a consequence, it is important to identify the different environment conditions for each test case and ensure that the system is tested while those environment conditions hold. Automating this requirement becomes one of the major challenges of the test automation tools. Specifically, a test automation tool must plan and schedule test cases in such a way that the associated test cases get tested as quickly as possible.

DESCRIPTION OF RELATED ART

U.S. Pat. No. 6,434,364 to O'Riordain; Fergal (Dublin, IE) for "Wireless communication system that supports mobile test software agents" (issued on Aug. 13, 2002 and assigned to Telefonaktiebolaget LM Ericsson (publ) (Stockholm, SE)) describes a communication system that supports mobile test software agents to allow for system performance measurements at a specified test location based on location information contained within location registers.

U.S. Pat. No. 6,680,913 to Malmivirta; Kari (Tampere, FI); Varjus; Olli (Tampere, FI); Saarinen; Tapio (Kello, FI); Kotilainen; Petri (Tampere, FI) for "Method and system for testing data channel functionality in a radio apparatus" (issued on Jan. 20, 2004 and assigned to Nokia Mobile Phones Ltd. (Espoo, FI)) describes a system for establishing a test loop between a mobile station and a test equipment to test data channel operation with data transmission controlled by a relatively low protocol level.

U.S. Pat. No. 6,714,779 to Hall; Christopher J. (424 Bridgetown Conn., Satellite Beach, Fla. 32937); Turner; Clay S. (130 Jade Cover Dr., Roswell, Ga. 30075); Ray; Jimmy C. (3355 Juanita Dr., Denison, Tex. 75020) for "Automated testing for cellular telephone system including emergency positioning" (issued on Mar. 30, 2004) describes a system for automatically testing cellular telephone equipment by determining a geographic location of a mobile unit based on observable signal parameters and testing functions include transmitting gradually increasing power levels on a frequency assigned to a particular base station to determine the power level required to acquire service from that base station.

U.S. Pat. No. 6,816,886 to Elvanoglu; Ferhan (Redmond, Wash.); Bengtson; Carl Robert (Bellevue, Wash.) for "Measuring performance metrics of networked computing entities" (issued on Nov. 9, 2004 and assigned to Microsoft Corporation (Redmond, Wash.)) describes a system for gathering performance metrics regarding remote computing entities remotely by routing a network message through specific computing entities of interest, and having the computing entities report performance metrics by adding entries into an editable portion of the network message.

"A testing framework for mobile computing software" by Ichiro Satoh (appeared in IEEE Transactions on Software Engineering, Vol. 29, No. 12, December 2003) describes a framework for testing applications for mobile computing devices and the framework provides an application-level emulator for mobile computing devices to solve the problems related to the availability of resources and services.

The known systems do not address the issue of automatic testing of environment dependent test cases in the context of mobile wireless devices. The present invention provides with a self-testing system to help automatically test such test cases. Further, the present invention proposes an approach for group testing to efficiently test as many test cases as possible whenever suitable environment conditions occur.

SUMMARY OF THE INVENTION

The primary objective of the invention is to achieve automatic testing of environment dependent test cases of mobile wireless devices. This is achieved by automatically sensing environmental conditions and initiating execution of appropriate test cases.

One aspect of the present invention is the management of self-test agents wherein self-testing system manages application-specific multiple agents, collectively called self-test agents, by creating and destroying these agents on need basis.

Another aspect of the present invention is the management of test cases, environment variables and expressions, and test results, wherein test manager manages test case details including test data, expected result, environment expression, and application information, environment details including type and list of values, and test result details including timestamp and obtained test result.

Yet another aspect of the present invention is the scheduling of test cases wherein application specific test cases are scheduled based on application criticality and environment information.

Another aspect of the present invention is distributed environment sensing agent functionality, wherein distributed environment sensing agent obtains the sensed environment information, both local and distributed information, and provides the same to application agents.

Yet another aspect of the present invention is application agent functionality, wherein application specific agent manages the scheduled application specific test cases and the corresponding environment information.

Another aspect of the present invention is to provide test scheduler agent functionality, wherein application specific agent manages reactive, proactive, and predictive scheduling of application specific test cases.

Yet another aspect of the present invention is to provide test execution monitoring agent functionality, wherein application specific agent manages the execution of application specific test cases.

Another aspect of present invention is to provide test results agent functionality, wherein the application specific agent manages the test results of the application specific test cases.

Another aspect of the present invention is to provide group testing functionality, wherein a network of similar mobile wireless devices is used to efficiently execute test cases.

BRIEF DESCRIPTION OF THE DRAWINGS

FIG. 1 depicts the architecture of Self-Testing System (STS).

FIG. 2 depicts the key elements of Test Manager (TM) subsystem.

FIG. 3 depicts the key elements of Self-Test Manager (STM) subsystem.

FIG. 4 depicts the network architecture of STS system.

FIG. 4a depicts a typical workflow of STS system.

FIG. 5 provides a brief description of the various databases of STS system.

FIG. 6 describes the procedures related to application management.

FIG. 7 describes the procedures related to environment management.

FIG. 8 describes the procedures related to the management of test cases.

FIG. 9 describes the procedures related to test results management.

FIG. 10 describes the procedures related to test scheduler functionality.

FIG. 11 provides the network architecture for group testing.

FIG. 12 describes the scheduling procedure related to group testing.

FIG. 13 describes the procedures related to agent manager.

FIG. 14 depicts the network architecture for distributed environment sensing.

FIG. 14A describes the procedure related to distributed environment sensing.

FIG. 15 describes the procedures related to application agent.

FIG. 16 describes the procedures related to test scheduler agent.

FIG. 17 describes the procedures related to test execution monitoring agent.

FIG. 18 describes the procedures related to test results agent.

FIG. 19 describes the procedures related to coordination agent.

FIG. 20 depicts run-time environment of STS system.

DETAILED DESCRIPTION OF THE PREFERRED EMBODIMENTS

FIG. 1 depicts a high level system architecture of Self-Testing System (STS) consisting of two main subsystems, namely, Test Manager (TM) and Self-Test Manager (STM). The main objectives of STS are to (a) manage application specific, environment dependent test cases and test data; (b) manage application independent environment variables; (c) to help bind environment expressions to application specific test cases; (d) to schedule application specific test cases; (e) to help download applications and scheduled application specific test cases to mobile wireless devices; (f) to reactively, proactively, and predictively execute downloaded test cases under suitable conditions; and (g) to facilitate group testing.

Mobile device manufacturers expend extensive efforts in testing their devices in order to ensure high reliability of the devices. With markets expanding globally, it has become necessary to test these devices in various geographies and with respect to various services and applications to be able to successfully sell their devices in those market segments. This poses a major a challenge to manufacturers to manage efficient testing as different versions and models get released to the market at regular intervals. While manufacturers manage multiple test labs, it is a difficult proposition to have them in all market segments. Test labs have adequate tools to help test the devices in an efficient way and absence of these labs in distant geographies require an exploitation of device specific tools and techniques. Specifically, three important tools that play a crucial role in the testing of mobile wireless devices are (a) Test Automation Tool to automatically execute test cases and record test results; (b) Remote Testing Tool to help initiate the execution of test cases using remote test servers; and (c) Self-Testing Tool to help schedule and execute test cases automatically without any need for an external test server. While there are various tools to help achieve test automation and remote testing, there is very little that has been done towards self-testing. The present invention describes a self-testing tool and specifically, to help automatically execute test cases that are dependent on external environment conditions.

It has been observed that testing of wireless devices is quite naturally affected by test environment. The barriers such as buildings, mountains, and tunnels adversely affect the quality and quantity of the received signal leading to unexpected behavior of applications. Similarly, adverse weather conditions could also affect the behavior of the applications. Further, the factors such as rain, snow, high humidity, extreme heat or cold, fog, high winds have also been observed to impact the wireless connectivity and speed of connection. Other hidden environmental factors of interest include bundles of copper wiring, concrete pillars, and water in pipes. On account of these factors and observed variations in these factors across different geographies, it becomes important to test the applications for their expected behaviors in these challenging environmental conditions. STS helps in binding various applications with the various environmental conditions and allows the testing of the applications under right environmental conditions. Note that a test case might get executed several times to ensure that the applications behave properly under all trying environmental conditions TM subsystem (100) takes Application under test (102) as input and with the help of Application related test cases (104) and Application related environmental factors (106), that together form Test Cases DB (108), generates Test Results DB (110). Test Cases DB is a collective repository of all environment dependent test cases, along with test data and specific environmental factors, associated with various test cases. TM (100) interacts with STM (112) to get these test cases automatically executed on a mobile wireless device in a realistic environment. STM (112) continuously senses the environment (114) to determine when a particular group of test cases needs to be executed. Further STM (112) interacts with other STMs (116) to efficiently group test a set of test cases.

FIG. 2 provides a brief description of the functional architecture of TM. The overall functionality of TM (200) is described using six subsystems: Application Manager (202), Environment Manager (204), Test Case Manager (206), Test Results Manager (208), Test Scheduler (210) and Agent Manager (212). Application Manager (202) manages the various applications that are under test while Environment Manager (204) maintains the information related to environmental factors that affect the applications being tested. Test Case Manager (206) helps in binding test cases with test data, applications, and environmental factors while Test Results Manager (208) records the obtained test results. Test Scheduler (210) schedules the various application specific, environment dependent test cases to be executed on mobile wireless devise, and Agent Manager (212) interacts and coordinates with mobile wireless devices to help automatically execute the scheduled test cases.

FIG. 3 provides a brief description of the agent based functional architecture of STM. The overall functionality of STM (300) is described using six agents: Distributed Environment Sensing (DES) agent (302), Application (App) agent (304), Test Scheduler (TS) agent (306), Test Execution Monitoring (TEM) agent (308), and Test Results (TR) agent (310), and Coordination (CD) agent (312). DES agent (302) continuously senses the environment and provides information about the changing environment conditions to App agents. Note that App agents are application specific and an App agent gets created for each application under test. As part of the system, two distinct kinds of sensors are identified: device-specific sensors are those sensors that are a part of a device; and network-specific sensors are those sensors that are managed by environment servers distributed on a network. DES agent obtains information from both these kinds of sensors and provides a unified interface to the other agents. App agent (304) manages the test cases related to an application, and receives and processes environment information. TS agent (306) uses multiple factors in scheduling a set of marked test cases related to the various applications under test. There are three kinds of scheduling: Reactive scheduling in which the marked test cases prioritized and scheduled; Proactive scheduling in which based on the prevailing environmental conditions, the most appropriate test cases are obtained from TM; and Predictive scheduling in which the predicted environmental conditions are used to obtain the test cases from TM. TEM agent (308) helps in the execution of the marked test cases with respect to the associated applications and TR agent (310) records the generated test results. CD agent (312) interacts with TM and other STMs through appropriate communication channels, obtains the information, and passes the same to other agents.

FIG. 4 provides a brief description of the network architecture of STS system. Central Test System (400) is connected to multiple TMs via a wirleline network (402). TM (404) is connected to multiple STMs, each STM on a mobile wireless device, via a wireless network (406). In order to facilitate group testing, STM on a mobile wireless device (408) is connected to other STMs via a wireless local network (410). Sensors are located both on devices (412) and on network (414) to continuously sense and gather information about environment (416). This kind of network architecture provides for both reactive and proactive scheduling, and allows for the immediately availability of the test status of applications under test and test results. In certain cases, a real-time, wireless connection between TM and STM could be absent.

FIG. 4A describes a typical workflow related to STS system. The workflow depicts a scenario in which Central Test System sends test cases, environmental conditions, and application information to TM. TS of TM schedules the test cases associated with an application and sends them to the various scheduled STMs. TS schedules the test cases targeted for various devices and also provides information about human agents who would be involved in environment dependent testing. Further, TS also provides information such as location information to these human agents. TM sends the information related to scheduled test cases to the CD agent of STM deployed on a mobile device that in turn updates the database that is accessible to other agents. CD agent sends the information about the test cases to the App agent that uses the environment related information received from the DES agent to mark those test cases that could get executed. The TS agent analyzes these marked test cases and schedules them for execution by the TEM agent. The results of the successfully completed execution are analyzed by the TR agent. The results are sent back to TM via the CD agent of STM and finally back to Central Test System.

FIG. 5 provides a brief description of a few important elements of the major databases of STS system. Environment expression format (500) consists of information such as textual description and conjunctive normal form of expression. Environment variable information (502) includes such information as its description, type, and bounds on the variable value. Application information database (504) includes such information as application criticality, number of test cases, and date by which testing needs to be completed. Test case related information (506) includes its description, stub details, environment expression, and test data. Test Data DB (508) provides information related to test data, test cases related to applications are part of App Test Case DB (510), and test results are part of App Test Results DB (512). Information related to sensed environment (514) includes such information as physical location where the environment condition has been observed, timestamp, and the observed value.

FIG. 6 describes the procedures related to application manager functionality. The input request is analyzed (600) and if the input is related to a new application (602), then input application details such as application name, number of test cases, test start date, and expected test end date are obtained (604). The information is validated for consistency and the database is updated (606). If the input is related to the modification of some application details (602), then these details are obtained (610). The information is validated for consistency and the database is updated (612). If the input is related to the binding of agent details (602), then the self-test manager details such as information related to the creation of new agents are obtained, validated, and associated with the application (620). In the next step, the database is updated (622). If the input is related to the request for application status (602), then the required details are obtained from the database (630). The information is packaged and sent back (632). Finally, if the input request is to close an application (602), the application status is suitably modified (640), and the database is updated (642).

FIG. 7 describes the procedures related to environment manager functionality. The input request is analyzed (700) and if the input is related to a new environment variable (702), then the input environment details such as name, type, typical value, valid range, and some information on the possible locations where the different conditions with respect to the environment variable are observed is obtained (704). The information is validated for consistency and the database is updated (706). If the input request is related to the modification of an environment variable (702), then the required modifications are obtained (710). The information is validated and the database is updated (712). If the input request is related to the defining of an environment variable (702), the information related to the environment variable sensing function is obtained (720). The DES agent that is part of STM subsystem uses this function to periodically sense the environment with respect to this variable. The information is validated and the database is updated (722). If the input request is to delete an environment variable (702), the information related to the variable is obtained (730), and the database is suitably updated (732).

FIG. 8 describes the procedures related to test case manager functionality. The input request is analyzed (800) and if the input is related to a new test case (802), then the input test case details such as test case description, test data, and expected results are obtained (804). The information is validated for consistency and the database is updated (806). If the input request is related to application binding (802), then the information such as application related information and details of a test case is obtained, the information is validated, and app ID is associated with the test case (810). Finally, the database is updated (812). If the input request is related to environment expression binding (802), the information related to an environment expression and a test case is obtained, the information is validated, and the environment expression is associated with the test case (820). In the next step, the database is updated (822). If the input request is to delete a test case (802), the information related to the test case is obtained and the test case is deleted (830), and the database is suitably updated (832).

FIG. 9 describes the procedure related to test results manager functionality. The information related to the completed test cases is obtained (900). The details of the application associated with the test cases are determined (902). The obtained test results are validated with respect to the expected results (904). The database is suitably updated (906). A check is performed to determine whether all the test cases associated with the application are completed (908). If so, the database is suitably updated (910).

FIG. 10 describes the procedures related to the scheduling of test cases. There are two phases in scheduling. In the first phase, the test cases associated with an application are grouped based on their dependence on environment conditions. Such a grouping allows for scheduling of test cases in such a way that when a particular environment condition is observed, many of these test cases can get executed. In the second phase, based on additional information involving geographical locations and environmental conditions, the test cases that are part of a cluster are scheduled, downloaded to a target mobile wireless device, and the corresponding location profile is provided to a human agent. The phase one begins with the input of an application ID (1002). The test cases associated with the application are determined (1004). For each test case, the corresponding environment condition is determined (1006). Note that this condition is described in the form of conjunctive normal form (CNF) and clustering is based either on this form, wherein the members of a cluster have similar CNFs, or based on a set of environment variables that are part of an environment expression, wherein the members of a cluster have similar such sets (1008). Based on the chosen method, the clustering is performed to group the test cases (1010). The clustering objective is to group test cases in such a way that when a particular environment condition occurs, as many of the specific test cases as possible get executed and at the same time, the number of test cases that are downloaded to a device does not overload the device (1012).

Phase two is performed at regular intervals, say for example, twice a day. Several applications under test are analyzed with respect to their expected end date, criticality, and the number of remaining test cases to order them for scheduling purposes (1020). The scheduling of test cases depends on (a) the number of target mobile wireless systems; and (b) configuration and capabilities of these devices (1022). For each such target system, Steps 1026 through 1040 are performed (1024). Select one or more applications, from the ordered list, based on (a) environment conditions; (b) related clusters of the various applications; and (c) the target system configuration and capability (1026). Some locations may have characteristic environment conditions and this fact is exploited to ensure that test cases of various applications that are dependent on a particular environment condition are assigned to one or more mobile wireless devices. Test cases are selected from the test case clusters of the various applications (1028). Based on these test cases, determine the related environment variables (1030). As a next step, appropriate locations where the required environment conditions likely to occur are determined (1032). If more than one location needs to be covered, an appropriate route is determined (1034). Agent Manager configures the various agents of STM based on application information (1036). Finally, the test cases are downloaded onto the target mobile wireless device (1038) and the route plan to cover the various locations is provided to the assigned human agent (1040).

Group testing involves using a set of mobile wireless devices to collectively execute as many cases as possible under suitable environment conditions. Typically, in this case, a group of devices interact with each other though a wireless local area networking in order to exchange information about prevailing environment conditions and execution status of the various test cases. Based on this information, the test cases are moved from one device in the group to another to efficiently execute collectively the test cases. Further, in order to facilitate a smooth interaction, one of the devices of the group acts as a group leader and this device has an entire set of test cases to be executed by the group. The group leader distributes the test cases among the group members and ensures that the test cases are executed under best possible environment conditions. FIG. 11 describes the network architecture for group testing. Even though the devices are part of a wireless local area network, the environment conditions may vary over the overall region collectively covered by the group.

FIG. 12 describes the procedure related to group testing. One or more applications to be group tested are determined (1200). Based on the selected applications, test cases are identified (1202) and the number of devices to be part of a group is determined (1204). This is dependent on such factors as the total number of test cases to be group tested and the stability of environment conditions. One of devices is selected as a group leader (1206), and test cases and device IDs of the group members are downloaded onto the group leader (1208). The route plan for each group member is determined (1210) and finally, the respective route plans are provided to each of the human agents (1212).

FIG. 13 describes the agent manager functionality. The input request is analyzed (1300), and if the kind of request is related to a new app agent (1302), then input app agent details are obtained. A set of agents that are part of STM are configured and packaged (1304). The input is validated and the database is updated (1306). If the request is to modify agent information (1302), the existing and additional agent details are obtained and the information is validated (1310). In the next step, the database is updated (1312). If the request is to provide status information (1302), agent details such as details of targeted devices and the status of test cases associated with various applications bound with the agents are obtained (1320). This obtained information is formatted and sent (1322). If the request is to delete an agent information (1302), then the information related to the agent is deleted (1330), and the database is suitably updated (1332).

Environment sensing is essential to execute environment dependent test cases. Environment conditions change over a geographical area and hence, it is required to deploy a set of distributed sensors to monitor and measure environment characteristics. It has been observed that there are multiple environment conditions that play a role during the execution of applications on a mobile wireless device. Some of such environmental factors include: (a) Thick fog; (b) Thick snow; (c) Building facade; (d) Building materials (such as type of building material used (plywood, metal sheet, carpet, ceramic tiling, etc.); (e) Speed of mobile equipment; and (f) Location within building. In order to achieve distributed sensing, sensors are expected to be distributed and are inter-connected. Such networked sensors provide information about environment to help identify the best locations to executed environment dependent test cases. FIG. 14 provides an overview of network architecture of distributed sensors. Note that environment monitors distributed over a network provide environment related to information to STMs to process test cases.

FIG. 14A describes the procedure related to DES agent functionality. A DES agent on a mobile wireless device uses sensor specific functions to obtain local environment sensor information (1400). This information is validated and used to update environment variables (1402). In order for App agents to mark additional test cases based on the changed environmental conditions, a message is sent to the App agents (1404). Similarly, the DES agent on a mobile wireless device interacts with environment monitors through a network to obtain distributed senor information (1410). This information is validated and used to update environment variables for each distributed location separately (1412). Finally, a message is sent to App agents (1414).

FIG. 15 describes the procedures related to App agent functionality. Input request is analyzed and if the request is related to new test cases (1500), then the test cases are received, verified for consistency, and the database is updated (1502). Note that there are distinct App agents for distinct applications. If the information is related to requesting for application status (1500), then the status information related to the test cases in the database is obtained (1510), and a suitable message about the application status is sent to TM (1512). On the other hand, if the input is related to local environment information (1500), then the information related local environment conditions is received from DES agent (1520). This information is validated, the various test cases related environment expressions are evaluated, and the database is updated (1522). Test cases are marked based on the respective environment expressions and the value of environment variables (1524). If any test case mark is changed, information to this effect is sent to TS agent (1526). If the input is related to distributed environment information (1500), then the information related to distributed environment information is received (1530). This location based information is validated, the various test cases related environment expressions are validated, and the database is updated (1532). If the local environment in not conducive for executing any more test cases, then test cases are marked based on the distributed environment information (1534), the marked test cases are sent to TS agent (1536), and the new location information is provided to the human agent (1538). If the input is related to closing of an application session (1500), the status of the test cases associated the application is checked (1540). If all the test cases are completed, the corresponding test results are sent to TM (1542). Finally, the test cases are removed from the database (1544). On the other hand, if the input request is related to discarding of certain test cases (1500), an environment expression is received from Test Manager (1550), and test cases matching with the environment expression are identified and deleted from the database (1552).

FIG. 16 describes the procedures related to TS agent functionality. If the input is related to new additional test cases (1600), the marked test cases are obtained from the database (1602). Based on timestamp and test case criticality, the existing and additional marked test cases are reordered (1604), and the database is updated (1606). If the input is related to reactive scheduling (1600), the next marked test case is selected for execution (1610). Note that the reactive scheduling is invoked on completion of a test case execution. This test case is sent to TEM (1612) and on receiving the completion message from TEM, the database is suitably updated (1614). On the other hand, if the input is related to proactive scheduling (1600), if there are no marked test cases available for execution, then the current consistent environment information is packaged (1620), and sent to TM (1622). The objective of proactive scheduling is to interact with TM to determine if there are any application specific test cases that could be executed in the prevailing environment conditions. If the input is related to predictive scheduling (1600), with respect to an application, the environment variables of interest are determined (1630). For each of these variables, the environment conditions are predicted (1632). Based on the prediction accuracy factor of the predicted value of environment variables, a subset of environment variables is identified (1634). This information is packaged and sent to TM (1636). The motivation for predictive scheduling is to test as many test cases as possible when the human agents along with the mobile wireless devices are in the field.

FIG. 17 describes the procedure related to TEM agent functionality. A test case is received from the TS agent (1700). The test case is analyzed and the database is accessed to obtain the corresponding test data (1702). If App id is not active, the application is activated via an automated tester (1704). Further, the automated tester is instructed to execute the received test case with respect to the application (1706). On completion of the execution, test result is obtained (1708) and the result is sent to the TR agent (1710). Subsequently, a completion message is sent to the TS agent (1712).

FIG. 18 describes the procedure related to TR agent functionality. The test result related to a test case is received from the TEM agent (1800) and the result is analyzed with respect to the various environment variables that are part of the environment expression associated with the test case (1802). If all environment variables are within their bounds, then the test case is updated as completed (1804). Finally, the database is updated (1806).

FIG. 19 describes the procedure related to CD agent functionality. The input is analyzed and if the input is related to a new application (1900), then the application related information is obtained from TM (1902). App agent is created and bound with the received App ID (1904). Other agents, namely, DES, TS, TEM, and TR, are created and bound with the appropriate information based on the obtained information (1906). The environment variables of interest to the application are obtained and are associated with the DES agent (1908). Finally, the database is updated (1910). If the input is related to test cases (1900), then the test cases are received and the associated App ID is identified (1920). The database is suitably updated and a message is sent to the corresponding App agent (1922). If the input is related test results (1900), then the test results are received and the associated App ID is identified (1930). The results are packaged and sent to TM (1932). If the input is related to closing of an application (1900), the associated App ID is identified, a message sent to the corresponding App agent, and databases are cleaned by deleting the data associated with App ID. (1940). Further, the created agents that are specific to App ID are also deleted (1942). Finally, if the input is related to environment information (1900), the new environment information is obtained from event monitors and sensors (1950). This obtained information is sent to all DES agents (1952).

FIG. 20 provides a brief description of STS run-time environment. Three distinct spaces are identified as part of the run-time environment. App space contains the various applications that are invoked through Automated Tester. Agent space contains application specific agents, namely, DES, App, TS, TEM, and TR. The CD agent is common across multiple applications, and helps in establishing agent interactions and interactions between TM and STM. Data space contains application specific data items, namely, test cases, test data, and test results, and also application independent, location specific environment data.

Thus, a system and method for automatic testing of mobile wireless device applications in realistic environments based on a set of agents, and by determining external environment conditions and executing the most appropriate test cases based on such conditions is disclosed. Although the present invention has been described particularly with reference to the figures, it will be apparent to one of the ordinary skill in the art that the present invention may appear in any number of systems that perform automatic testing of applications with respect to environment conditions. It is further contemplated that many changes and modifications may be made by one of ordinary skill in the art without departing from the spirit and scope of the present invention.

What is claimed is:

1. A self-testing system for automatic testing of a plurality of mobile wireless devices in a realistic environment using a plurality of test cases with respect to a plurality of applications, based on a database, a test manager, a plurality of agents, and a plurality of human agents, said system comprising:

a test scheduling element for scheduling said plurality of test cases;

an application agent element for managing an application of said plurality of applications; and a coordinating agent element for managing inter-system and intra-system interactions, wherein:

said test scheduling element further comprising:

ordering of said applications based on scheduled end date and number of remaining test cases;

determination of a plurality of target systems based on said plurality of mobile wireless devices;

selection of a selected target system from said plurality of target systems;

selection of a plurality of scheduled applications from said plurality of applications based on a plurality of environment conditions, a plurality of clusters associated with each of said plurality of applications, and configuration and capability of said selected target system, wherein a cluster of said plurality of clusters is based on a plurality of environment expressions;

identification of a plurality of selected clusters from said plurality of clusters associated with each of said plurality of scheduled applications;

determining of a plurality of selected test cases from each of said plurality of selected clusters;

determining of a plurality of environment variables based on said plurality of selected test cases;

determining of a plurality of locations based on said plurality of environment variables;

determining of a route based on said plurality of locations;

configuration of a plurality of specific agents with respect to each of said plurality of scheduled applications and said selected target system, wherein each of said plurality of specific agents is a part of said plurality of agents;

downloading of said plurality of selected test cases to said selected target system;

selection of a human agent from said plurality of human agents; and providing of said route to said human agent, said application agent element comprises means for processing of a plurality of information elements related to said application with respect to said database comprising:

updating of said database with said plurality of test cases;

determination of status of said plurality of test cases;

obtaining of a plurality of local environment information elements associated with said application;

marking of one or more of said plurality of test cases based on said plurality of local environment information elements;

obtaining of a plurality of distributed environment information elements associated with said application;

marking of one or more of said plurality of test cases based on said plurality of distributed environment information elements;

providing of location information based on said plurality of distributed environment information elements to said human agent;

obtaining of a remote environment expression;

identification of a plurality of remote test cases based on said remote environment expression and said plurality of test cases; and removal from said remote test cases from said database, and said coordinating agent element comprises means for processing a plurality of data elements with respect to said database comprising:

obtaining of a plurality of information elements related to an application of said plurality of applications from said plurality of data elements;

creation of an application agent related to said application;
binding of said application agent with said plurality of information elements;
creation of a distributed environment sensing agent;
creation of a test scheduler agent;
creation of a test execution monitoring agent;
creation of a test results agent;
obtaining of a plurality of environment variables from said plurality of information elements;
binding of said distributed environment sensing agent with said plurality of environment variables;
obtaining of a plurality of test cases from said plurality of information elements;
communicating of said plurality of test cases to said application agent;
obtaining of a plurality of test result elements from said plurality of information elements;
communicating of said plurality of test result elements to said test manager;
obtaining of a plurality of environment information elements from said plurality of data elements;
communicating of said plurality of environment information to said distributed environment sensing agent;
cleaning up of said database;
deletion of said application agent;
deletion of said distributed environment sensing agent;
deletion of test scheduler agent;
deletion of said test execution monitoring agent; and
deletion of said test results agent, and updating of said database.

2. A self-testing system for automatic testing of a plurality of mobile wireless devices in a realistic environment using a plurality of test cases with respect to a plurality of applications, based on a database, a test manager, a plurality of agents, and a plurality of human agents, said system comprising:
a test scheduling element for scheduling said plurality of test cases;
an application agent element for managing an application of said plurality of applications;
a test scheduler agent element for scheduling a plurality of application specific test cases with respect to an application of said plurality of applications, wherein an application-specific test case of said plurality of application specific test cases is a part of said plurality of test cases;
a coordinating agent element for managing inter-system and intra-system interactions; and
a group testing subsystem for testing using said plurality of mobile wireless devices, wherein:
said test scheduling element further comprising:
ordering of said applications based on scheduled end date and number of remaining test cases;
determination of a plurality of target systems based on said plurality of mobile wireless devices;
selection of a selected target system from said plurality of target systems;
selection of a plurality of scheduled applications from said plurality of applications based on a plurality of environment conditions, a plurality of clusters associated with each of said plurality of applications, and configuration and capability of said selected target system, wherein a cluster of said plurality of clusters is based on a plurality of environment expressions;
identification of a plurality of selected clusters from said plurality of clusters associated with each of said plurality of scheduled applications;
determining of a plurality of selected test cases from each of said plurality of selected clusters;
determining of a plurality of environment variables based on said plurality of selected test cases;
determining of a plurality of locations based on said plurality of environment variables;
determining of a route based on said plurality of locations;
configuration of a plurality of specific agents with respect to each of said plurality of scheduled applications and said selected target system, wherein each of said plurality of specific agents is a part of said plurality of agents;
downloading of said plurality of selected test cases to said selected target system;
selection of a human agent from said plurality of human agents; and
providing of said route to said human agent,
said application agent element comprises means for processing of a plurality of information elements related to said application with respect to said database comprising:
updating of said database with said plurality of test cases;
determination of status of said plurality of test cases;
obtaining of a plurality of local environment information elements associated with said application;
marking of one or more of said plurality of test cases based on said plurality of local environment information elements;
obtaining of a plurality of distributed environment information elements associated with said application;
marking of one or more of said plurality of test cases based on said plurality of distributed environment information elements;
providing of location information based on said plurality of distributed environment information elements to said human agent;
obtaining of a remote environment expression;
identification of a plurality of remote test cases based on said remote environment expression and said plurality of test cases; and
removal from said remote test cases from said database,
said test scheduler agent element comprises means for proactive scheduling of said application based on a plurality of environment variables comprising:
packaging of a current consistent environment information based on said plurality of environment variables into a packeted environment information;
communicating of said packeted environment information to said test manager; and
obtaining of the most appropriate test cases based on said packeted environment information,
said coordinating agent element comprises means for processing a plurality of data elements with respect to said database comprising:
obtaining of a plurality of information elements related to an application of said plurality of applications from said plurality of data elements;
creation of an application agent related to said application;
binding of said application agent with said plurality of information elements;
creation of a distributed environment sensing agent;
creation of a test scheduler agent;
creation of a test execution monitoring agent;
creation of a test results agent;

obtaining of a plurality of environment variables from said plurality of information elements;
binding of said distributed environment sensing agent with said plurality of environment variables;
obtaining of a plurality of test cases from said plurality of information elements;
communicating of said plurality of test cases to said application agent;
obtaining of a plurality of test result elements from said plurality of information elements;
communicating of said plurality of test result elements to said test manager;
obtaining of a plurality of environment information elements from said plurality of data elements;
communicating of said plurality of environment information to said distributed environment sensing agent;
cleaning up of said database;
deletion of said application agent;
deletion of said distributed environment sensing agent;
deletion of test scheduler agent;
deletion of said test execution monitoring agent; and
deletion of said test results agent, and updating of said database, and
said group testing subsystem comprises means for group testing a plurality of target systems by said plurality of human agents comprising:
determination of said plurality of target systems based on said plurality of mobile wireless devices;
obtaining of said plurality of applications;
determination of a plurality of test cases associated with said plurality of applications;
determination of a group leader of said plurality of target systems;
obtaining of a plurality of environment conditions from a target system of said plurality of target systems;
distributing of said plurality of test cases to said target system by said group leader based on said plurality of environment conditions;
determination of a plurality of routes, wherein, each route of said plurality of routes is for a target system of said plurality of target systems; and
providing of each of said plurality of routes to a human agent of said plurality of human agents.

3. The system of claim 2, wherein said test scheduling element comprises means for processing of a plurality of test cases with respect to an application of said plurality of applications comprising:

determining of an environment expression associated with each test case of said plurality of test cases;
clustering of said plurality of test cases into a plurality of clusters based on said environment expression of each of said plurality of test cases; and
validation of said plurality of clusters for ensuring that the number of test cases in each of said plurality of clusters is about the same.

4. The system of claim 2, wherein said test scheduler agent element further comprises means for predictive scheduling of said application comprising:

determining of a plurality of environment variables related to said application;
prediction of each of said plurality of environment variables to yield a plurality of predicted environment variables;
identification of one or more of said predicted environment variables based on a predetermined prediction accuracy factors to yield a plurality of accurate environment variables;
packaging of environment information based on said plurality of accurate environment variables into a packeted environment information;
communicating of said packeted environment information to said test manager; and
obtaining of the most appropriate test cases based on said packeted environment information.

5. The system of claim 2, wherein said group testing subsystem further comprises means for moving a plurality of test cases from a target system of said plurality of target systems comprising:

obtaining a plurality of environment conditions with respect to said target system;
determining a plurality of execution status of a plurality of distributed test cases with respect to said target system;
obtaining a plurality of environment conditions from said plurality of target systems;
identification of a plurality of movable test cases from said target system based on said plurality of execution status and said plurality of environment conditions;
identification of an appropriate target system of said plurality of target systems based on said plurality of movable test cases and said plurality of environment conditions; and
moving of said plurality of movable test cases from said target system to said appropriate target system.

\* \* \* \* \*

UNITED STATES PATENT AND TRADEMARK OFFICE
CERTIFICATE OF CORRECTION

PATENT NO. : 7,627,312 B2  Page 1 of 1
APPLICATION NO. : 11/049800
DATED : December 1, 2009
INVENTOR(S) : Varadarajan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1219 days.

Signed and Sealed this

Second Day of November, 2010

David J. Kappos
*Director of the United States Patent and Trademark Office*